US012621054B2

(12) United States Patent
Heninwolf

(10) Patent No.: US 12,621,054 B2
(45) Date of Patent: May 5, 2026

(54) ADAPTIVE CODING SUCH AS FOR FREE-SPACE OPTICAL COMMUNICATION SYSTEMS

(71) Applicant: Aalyria Technologies, Inc., Livemore, CA (US)

(72) Inventor: Paul Daniel Heninwolf, San Carlos, CA (US)

(73) Assignee: AALYRIA TECHNOLOGIES, INC., Livermore, CA (US)

( * ) Notice: Subject to any disclaimer, the term of this patent is extended or adjusted under 35 U.S.C. 154(b) by 261 days.

(21) Appl. No.: 18/635,654

(22) Filed: Apr. 15, 2024

(65) Prior Publication Data

US 2025/0323726 A1      Oct. 16, 2025

(51) Int. Cl.
| | |
|---|---|
| *H04B 10/118* | (2013.01) |
| *H04B 10/40* | (2013.01) |
| *H04L 1/00* | (2006.01) |

(52) U.S. Cl.
CPC .......... *H04B 10/118* (2013.01); *H04B 10/40* (2013.01); *H04L 1/004* (2013.01)

(58) Field of Classification Search
None
See application file for complete search history.

(56) References Cited

U.S. PATENT DOCUMENTS

| | | | | | |
|---|---|---|---|---|---|
| 7,486,634 | B2 * | 2/2009 | Itoh | ...................... | H04W 52/50 |
| | | | | | 455/67.11 |
| 8,843,059 | B2 * | 9/2014 | Roos | .................. | H04B 7/18513 |
| | | | | | 455/12.1 |
| 9,780,888 | B2 * | 10/2017 | Khoshnevisan | ....... | H04B 15/00 |
| 11,184,121 | B2 * | 11/2021 | Iyer | ...................... | H04L 1/1614 |
| 11,456,804 | B2 * | 9/2022 | Brinkley | .......... | H04B 10/07955 |
| 2010/0061259 | A1 * | 3/2010 | Larsson | .................... | H04L 1/20 |
| | | | | | 370/252 |
| 2018/0091251 | A1 * | 3/2018 | Hanneman, Jr. | .... | H04J 14/0256 |
| 2023/0209230 | A1 * | 6/2023 | Larrigan | ............. | H04J 14/0284 |
| | | | | | 398/58 |

OTHER PUBLICATIONS

International Patent Application No. PCT/US2025/018422; Int'l Search Report and the Written Opinion; dated May 19, 2025; 13 pages.

* cited by examiner

*Primary Examiner* — Jai M Lee
(74) *Attorney, Agent, or Firm* — Baker Hostetler, LLP

(57)      ABSTRACT

Aspects of the present disclosure relate to adaptive coding of digital communications, such as for a free-space optical channel. Some implementations can transmit, via a first transceiver over a communications channel, a first series of data packets to a second transceiver. The first transceiver can receive a second series of data packets from the second transceiver, and an adaptive coder can analyze the second series of data packets to detect transmission conditions of the communications channel. The adaptive coder can execute one or more proactive actions based on the detected transmission conditions, such as sending error correction information for the first series of data packets and/or modifying one or more future transmission characteristics, and can do so before information regarding the reception of the first series of data packets is received from the second transceiver.

20 Claims, 14 Drawing Sheets

600

700

702

704
processing
units 706
working
memory

710
I/O 708
storage
memory

720

726
BIOS

722
OS 724
local
programs

740

742
interfaces 744
data packet
transmission
module 746
data packet
receipt module 748
transmission
condition
estimation module 750
error correction
module

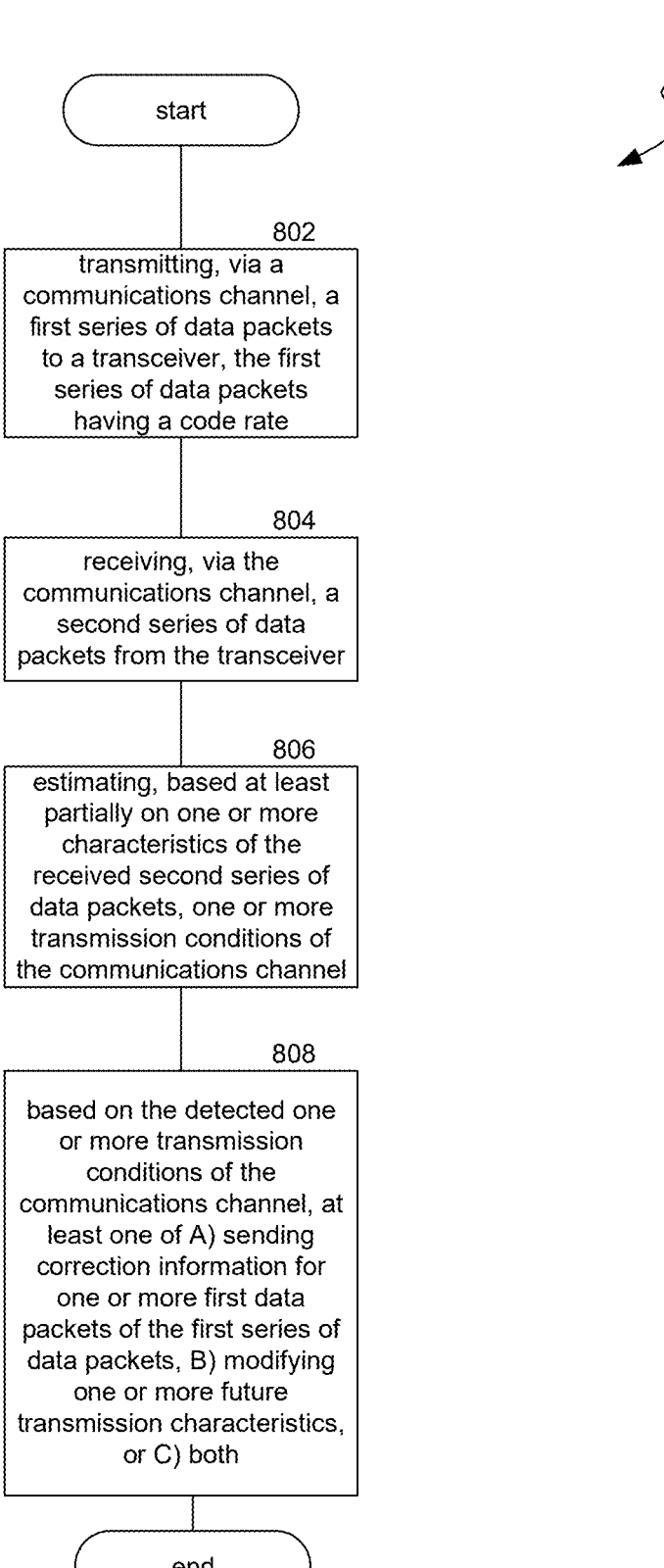

800 start

802
transmitting, via a communications channel, a first series of data packets to a transceiver, the first series of data packets having a code rate

804
receiving, via the communications channel, a second series of data packets from the transceiver

806
estimating, based at least partially on one or more characteristics of the received second series of data packets, one or more transmission conditions of the communications channel

808
based on the detected one or more transmission conditions of the communications channel, at least one of A) sending correction information for one or more first data packets of the first series of data packets, B) modifying one or more future transmission characteristics, or C) both end

*FIG. 8*

ADAPTIVE CODING SUCH AS FOR FREE-SPACE OPTICAL COMMUNICATION SYSTEMS

TECHNICAL FIELD

Aspects of the present disclosure relate to adaptive coding of digital communications, such as across a free-space optical channel.

BACKGROUND

Free-space optical communication (FSOC), due to its high data rate, high capacity, free license spectrum, and excellent security, offers an alternative to Radio Frequency (RF) or microwave communication in modern wireless communication. In a free-space optical communication system, a transmitter may transmit data at a high speed (e.g., 1 Gbps, 10 Gbps, 100 Gbps, 1 Tbps, or higher) using a narrow laser beam (e.g., in infrared wavelengths) that passes through the atmosphere to a line of-sight receiver. Free-space optical communication can offer point-to-point data communication at rates faster than other solutions available today, cover greater distances, offer connectivity where no supporting infrastructure exists, and is not susceptible to RF-based jamming techniques intended to interfere and disrupt the operation of RF communication systems. For example, free-space optical communication systems may be used to provide links to, from, or between aircrafts, space-crafts, balloons, satellites, ground vehicles and stations, and water-based vehicles and stations, and can deliver data services at high speed to sites that may otherwise have no access to high speed networks such as fiber optical networks. Free-space optical communication can radically improve satellite communications, connectivity on planes and ships, cellular connectivity, etc.

BRIEF DESCRIPTION OF THE DRAWINGS

FIG. 8 is a flow diagram illustrating a process used in some implementations for providing adaptive coding for transmitted data packets, such as in a free-space optical communication system.

The techniques introduced here may be better understood by referring to the following Detailed Description in conjunction with the accompanying drawings, in which like reference numerals indicate identical or functionally similar elements.

DETAILED DESCRIPTION

Figure 1:
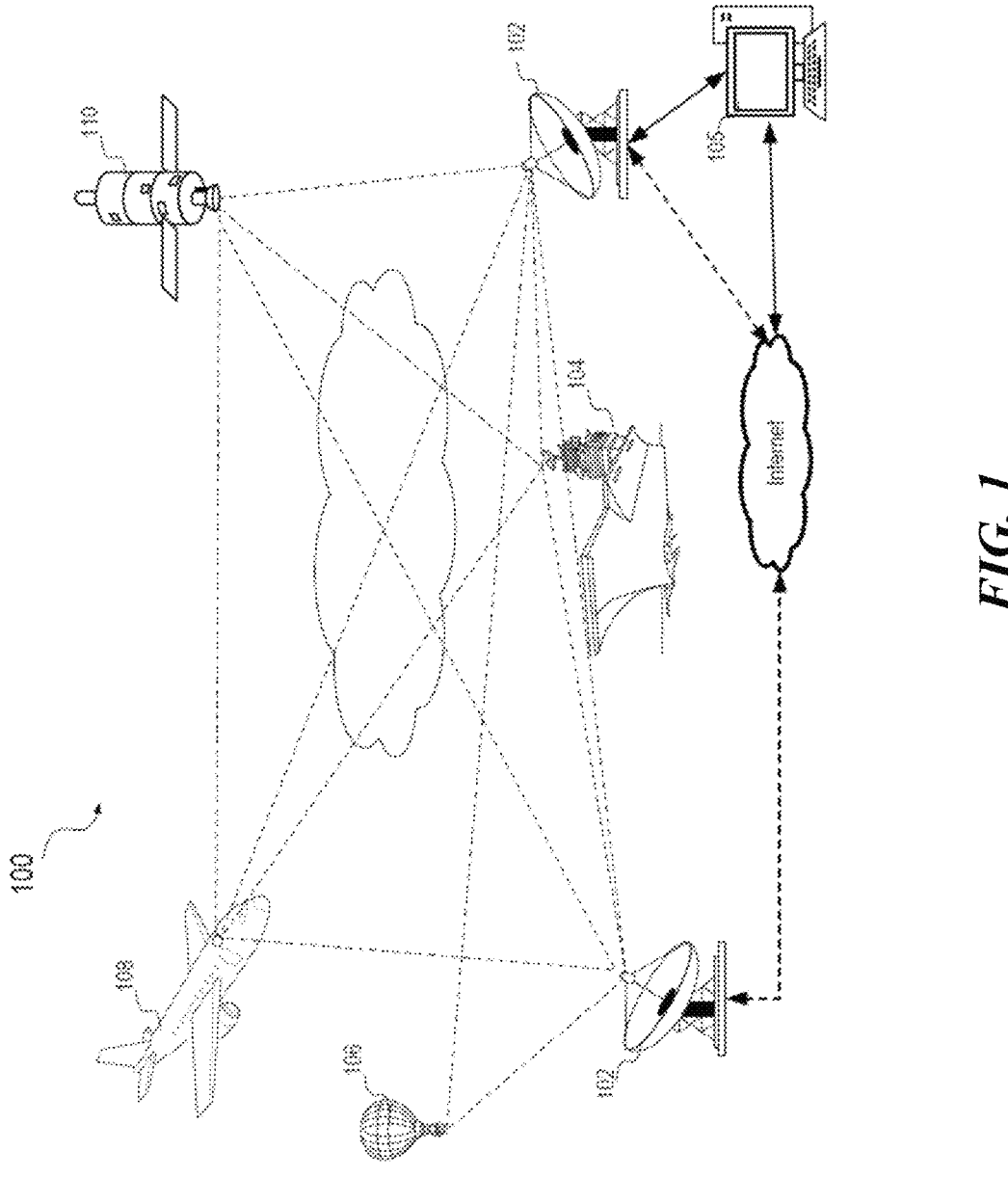
FIG. 1 is an example of a communication network that may be implemented using free-space optical communication.

Free-space optical communication can offer high data rate, high capacity, cost effectiveness, free license spectrum, security, and rapid deployment. However, optical signals transmitted through the air and/or atmosphere may be affected by environmental conditions, such as poor weather, air particulates, and other atmospheric conditions, before arriving at a receiver. For example, weather and/or other atmospheric effects can deteriorate the transmission by reducing the signal's optical power level due to attenuation, by causing interference, and/or by causing random optical power and phase fluctuations in the received signal results from, for example, beam spread, scintillation effects, and/or beam wander.

Variations in air density, temperature, humidity, pressure, wind speed, and the like in the atmosphere may lead to atmospheric turbulence, which can cause small scale, localized random pockets of varying indices of refraction, causing random fluctuation of a laser beam propagating through the atmosphere. The atmospheric turbulence can be time-variant, and its impacts to the laser beam can depend on, for example, the magnitude, type and size of the atmospheric disturbances, the channel length, and the wavelength of the light source. As such, when a carrier laser beam is transmitted between two terminals, the wavefront of the laser beam transmitted through the atmosphere may be distorted in both amplitude (i.e., scintillation) and phase (i.e., aberrations) for a cross-section of the laser beam. When the size of the turbulence cells is smaller than the diameter of the laser beam, the laser beam may experience distortion, and a non-uniform optical intensity across the wavefront may be observed. If the size of the turbulence cells is larger than the diameter of the laser beam, the laser beam may randomly wander. The combination of scintillation and beam wander can lead to fluctuations in overall signal stability. Spatial phase aberrations may also evolve into spatial intensity variation in the laser beam received at the entrance pupil of the optical antenna of the receiving terminal and within the receiving terminal.

Amplitude fluctuation and wave-front distortion caused by atmospheric turbulence can severely degrade the received signal power and increase the bit-error-rate (BER) of the communication system. A free-space optical communication system may need to be able to maintain real-time data transmission even during periods of strong turbulence. The data transmission rate in the free-space optical communication system can be 1 Gbps or higher, and thus a 1 millisecond interruption may result in millions of bit errors. Such performance may not be tolerable in the communication system.

Thus, aspects of the present disclosure relate to adaptive coding of digital communications, such as across a free-space optical channel, based on the characteristics of the communications channel. Some implementations can transmit, via a first transceiver over a communications channel, a first series of data packets to a second transceiver. The first transceiver can receive a second series of data packets from the second transceiver, and an adaptive coder (which can be integral with or separate from the first transceiver) can analyze the received data or other signal quality indications derived from the second series of data packets to detect transmission conditions of the communications channel.

The adaptive coder can execute one or more proactive and/or preemptive actions based on the detected transmission conditions, prior to receipt of acknowledgment of the first series of data packets from the second transceiver, such as sending correction information relevant to the first series of data packets, repeating transmission of one or more of the first series of data packets, and/or modifying one or more future transmission characteristics. In some implementations, the adaptive coder can select the correction information to send based on the detected transmission conditions. For example, the adaptive coder can determine a period of time in which transmission conditions were deteriorated (as determined from received signal quality indications such as reduced power or corrupted received data) and send correction information for data packets transmitted or otherwise within the communications channel during that period of time.

In some implementations, the adaptive coder can modify future transmission characteristics such as, for example, code rate (e.g., a proportion of one or more bits that carry source data to total bits in respective data packets), code type, modulation, transmit baud rate, or any combination thereof. In some implementations, the adaptive coder can use detected transmission conditions, in part, to select and/or execute the one or more proactive and/or preemptive actions, e.g., based on an amount of available throughput of the communications channel (e.g., from determined characteristics of the communications channel, limitations of terminal hardware, regulatory limits, etc.).

FIG. 1 illustrates an example of a communication network 100 that may be implemented using free-space optical communications. Communication network 100 may be a directional point-to-point communication network including network nodes (e.g., communication terminals) on various land-based, sea-based, air-based, or space-based structures, some of which may be mobile and can change position with respect to other nodes in communication network 100 over time. In the illustrated example, communication network 100 may include one or more datacenters 105, one or more land-based nodes 102, one or more sea-based nodes 104 (e.g., ships), and one or more airborne high altitude platforms (HAPs), such as one or more balloons 106, one or more airplanes 108, and one or more satellites 110. It is noted that communication network 100 shown in FIG. 1 is for illustration purposes only. In some implementations, communication network 100 may include additional or different network nodes. For example, in some implementations, communication network 100 may include additional HAPS, such as blimps, unmanned aerial vehicles (UAVs), or any other form of high altitude platforms. In some implementations, communication network 100 can omit one or more datacenters 105. In some implementations, communication network 100 may serve as an access network for client devices such as cellular phones, laptop computers, desktop computers, wearable devices, or tablet computers. Communication network 100 may be connected to a larger computer network, such as the Internet, and may be configured to provide a client device with access to resources stored on or provided through the larger computer network.

Some network nodes in communication network 100 may communicate with each other using optical wireless communication links through the atmosphere. In some implementations, at least some nodes in communication network 100 may include wireless transceivers associated with a cellular or other mobile network, such as eNodeB base stations or other wireless access points, such as WiMAX or UMTS access points. Some land-based nodes 102, sea-based nodes 104, balloons 106, airplanes 108, and satellites 110 may communicate with datacenter 105 directly (e.g., through RF communication with an antenna of datacenter 105), through the Internet, through a network nodes (e.g., a land-based node 102), or through backbone network links or transit networks operated by third parties. Land-based nodes 102, sea-based nodes 104, balloons 106, airplanes 108, and satellites 110 may provide wireless access for the users, and can route user requests to the datacenters 105 and return responses to the users via the backbone network links.

Datacenters 105 may include servers hosting applications that can be accessed by remote users and systems that monitor and control the nodes of communication network 100. In some implementations, datacenter 105 may implement a software platform for orchestrating land-based nodes 102, sea-based nodes 104, balloons 106, airplanes 108, and satellites 110, and other land-based networks. For example, the software platform may optimize and continually evolve the network link scheduling, traffic routing, and spectrum resources in real time. In one example, the software platform may provide information (e.g., location information) to two nodes that need to establish a point-to-point direct optical link between the two nodes, so that the two nodes can find each other in the three-dimensional space and establish the direct optical link. In some embodiments, datacenter 105 may operate networks across land, sea, air, and space, at any altitude or orbit type, support many radio frequency bands and optical wavelengths, and may be designed for interoperability with legacy, hybrid space, 5G new radio, non-terrestrial network (NTN), and future generation network architectures.

Some nodes of communication network 100 may be configured to communicate with one another using steerable wireless transceivers. For example, land-based nodes 102, sea-based nodes 104, balloons 106, airplanes 108, and satellites 110 may include optical transceivers and thus may directly communicate with each other using point-to-point optical links through the atmosphere. The optical transceivers may be mounted to actuators (e.g., gimbals) that may be controlled to point in a desired direction. To form a link between two nodes, the transceivers of the respective nodes can be controlled (e.g., based on information received from datacenter 105) to point in the direction of one another so that data can be transmitted and received between the two nodes. In some implementations, some of the nodes may include transceivers with omnidirectional antennas and therefore are not required to be steered towards other nodes to form communication links. Some of the nodes may include directional transceivers whose positions and pointing directions may be fixed. In some implementations, parameters associated with each transceiver may be controlled to facilitate formation of the links in communication network 100. For example, nodes having steerable directional antennas can be controlled to point in the direction of nodes with which they are to establish links. In addition, the power of the signals transmitted by each transceiver can also be controlled to facilitate formation of the links in communication network 100. For example, transceivers of nodes that are separated by a relatively large distance can be configured to operate at a higher power to compensate for the loss of signal-to-noise ratio that occurs over the distance separating the two nodes. Transceivers of nodes that are spaced nearer to one another may be controlled to operate at a relatively low power so as to save power. The communication channels and protocols for pairs of nodes that are to establish links can also be controlled to facilitate the formation of the links in communication network 100.

In general, each directional transceiver can be aimed at only one other transceiver at a given time, and each transceiver may be able to operate at a sufficiently high power level in order to form a link with a transceiver of another node. Omnidirectional nodes may only be capable of forming a limited number of simultaneous communication links and may transmit or receiver data at a low bandwidth in each communication link. As a result, the feasible topologies and available bandwidth for communication network 100 at a given time may be constrained. For example, each network node may have a fixed number of transceivers, and thus the number of links coupling a first node to other nodes (sometimes referred to as the degree of the first node) may not be greater than the number of transceivers associated with the first node. Furthermore, the maximum range for each transceiver may be limited by the maximum power output for the transceiver, and therefore a link may not be established between a pair of nodes that are separated by a distance that exceeds the maximum range for either one of the transceivers. In some implementations, the maximum power output for a transceiver can be constrained based on a variety of factors, such as a battery level, weather conditions that may impact solar power generation rates, remaining flight time for a HAP, and the like.

Further constraint on the feasible topologies of communication network 100 may include the requirement that the path between a pair of nodes should be clear of obstructions in order for the nodes to form a line-of-sight link. In some implementations, the relative motion of the nodes in communication network 100 may prevent the formation of links at some points in time. For example, a link between a balloon 106 (or an airplane 108) and a land-based node 102 (land station) may become unreliable, unfeasible, or unavailable at times during which clouds, mountains, buildings, or other obstacles are positioned between the two nodes. Thus, movement of some nodes, as well as external events such as weather or failure of one or more transceivers, may limit the nodes that are reachable from a given node at a given time in communication network 100. As result, links and routing information may need to be continuously updated based on the respective locations of the network nodes and other properties of the network nodes to maintain connectivity across communication network 100 over time. In some implementations, an input graph representing all of the possible links that can be formed in the network at a given time can be generated and processed to generate a subgraph that conforms to the constraints discussed above while satisfying any provisioned network flows.

As described above, free-space optical communication (FSOC) may offer an alternative to radio frequency (RF) and microwave communication in modern wireless communication due to its high data rate, high capacity, cost-effectiveness, free license spectrum, excellent security, rapid deployment, and the like. For example, in a free-space optical communication system, a transmitter may transmit data at a data rate of about 1 Gbps to about 1 Tbps, or higher. However, optical signals transmitted through the atmosphere may be affected by the atmosphere before arriving at a line-of-sight receiver. Atmospheric effects, such as atmospheric turbulence, may deteriorate free-space laser beam transmission by reducing the overall optical power level received by a detector of the receiver due to atmospheric attenuation, and/or causing random optical power fluctuations in the received signal resultant from beam deformation, scintillation effects, beam wander, and the like. To overcome such effects of the atmosphere on the transmitted laser beam, adaptive optics may be used to correct the phase perturbations (aberrations) in the received light beam, such that the received light beam may be focused into a single symmetric (e.g., circular) light spot that can be more efficiently coupled into the fiber. An adaptive optics system may generally estimate the phase perturbations (aberrations) of the received light beam and generate additional phase changes conjugated with the estimated phase perturbations in the received light beam (e.g., using a deformable mirror or an SLM) to compensate for the disturbances. In many AO systems, the performance of phase-only AO compensation may be limited due to, for example, limited accuracy and/or resolution of the phase aberration estimation or measurement, and/or limited phase compensation range, resolution, accuracy, and speed of the phase compensation components (e.g., deformable mirrors or SLMs).

Figure 2:
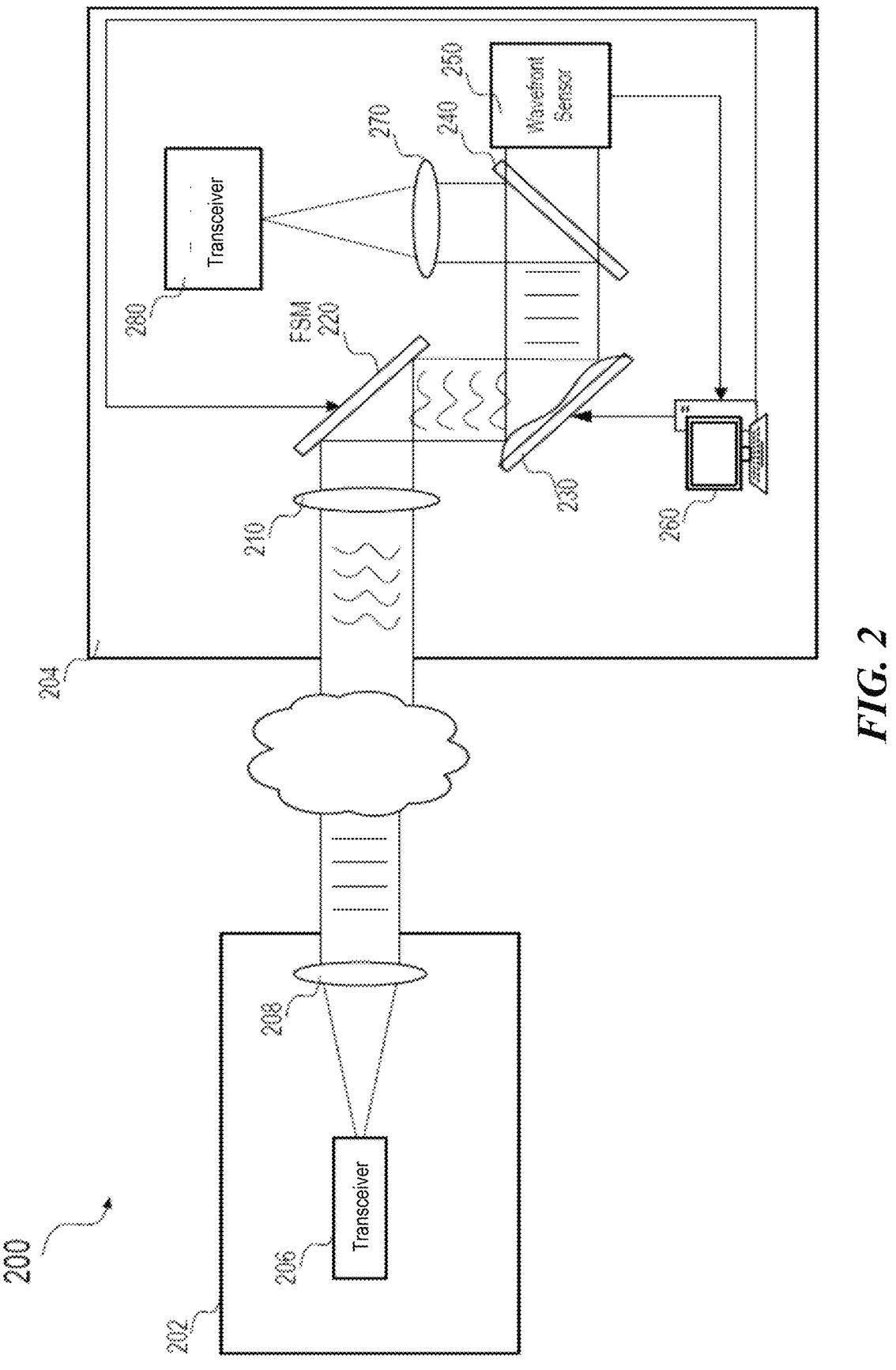
FIG. 2 is an example of a point-to-point free-space optical communication system.

FIG. 2 illustrates an example of a point-to-point free-space optical communication system 200. In the example illustrated in FIG. 2, FSOC system 200 includes two terminals 202 and 204 in a point-to-point optical link through atmosphere. Terminals 202 and 204 may be mounted to any of the network nodes of communication network 100 described above with respect to FIG. 1. Terminal 202 may include a transceiver 206. When functioning as a transmitter, transceiver 206 can be configured to generate optical signals that are modulated using data to be transmitted. Terminal 202 may also include an optical antenna 208 configured to substantially collimate the optical signals to form a laser beam with a small divergence angle and transmit the laser beam towards terminal 204. The transmitted laser beam at the output aperture of terminal 202 may be a plane wave having a flat wavefront. Although illustrated and described herein as including only optical antenna 208 at terminal 202 when functioning as a transmitter, it is contemplated that transceiver 206 can also function as a terminal receiver. In such implementations, terminal 202 can have similar components and functions as those described herein with respect to terminal 204.

In the example shown in FIG. 2, terminal 204 may include a fast steering mirror (FSM) 220, which may be controlled to steer the light beam received by optical antenna 210 to correct the angle of incidence when acting as a receiver. FSM 220 may steer the received light beam towards a deformable mirror 230 or another phase correction device, such as a liquid crystal device or a spatial light modulator.

Deformable mirror 230 may be controlled to change the shape of its reflective surface, thereby applying appropriate phase delays to different regions of the received light beam to change the wavefront of the received light beam. The light beam reflected by deformable mirror 230 may be split by a beam splitter 240, where a portion of the light beam may be directed towards a wavefront sensor 250, whereas the other portion of the light beam may be directed to transceiver 280 by optics 270. Wavefront sensor 250 may measure the wavefront of the received light beam. The measured wavefront may be used by a controller 260 to control deformable mirror 230 and/or FSM 220. The control loop may allow real-time control of FSM 220 and the deformable mirror surface, such that the phase delays applied by the deformable mirror to the received light beam may compensate the phase aberrations of the received light beam to achieve a substantially flat wavefront. As such, optics 270 may form a single light spot on the image plane (e.g., an input port of a single-mode fiber of transceiver 280).

In some implementations, terminals 202, 204 can be nearly identical, or the ground-side terminal could be more complex. In some implementations, transceiver 206 and transceiver 280 can concurrently act as transmitters and receivers and can be nearly identical. Thus, in some implementations, transceiver 206 and transceiver 280 can utilize one or more of the same components in the sending and receiving paths. However, in some implementations, transceiver 206 and transceiver 280 can utilize different optics and/or components in their transmit and receive paths, such as is described further with respect to FIG. 3A. When acting as a transmitter, transceiver 280 can be configured to generate optical signals that are modulated using data to be transmitted. Optics 270 can be configured to substantially collimate the optical signals to form a light beam with a small divergence angle. The laser beam can be split by beam splitter 240, and directed to deformable mirror 230. The light beam directed to deformable mirror 230 can be transmitted by optical antenna 210 towards terminal 202. The transmitted laser beam at the output aperture of terminal 204 may be a plane wave having a flat wavefront.

Due to the high loss in atmosphere in long distance FSOC links, the transmitting terminal of a link may need to transmit light with high power, such as a few watts or tens of watts, while the receiving terminal may only receive a small portion (e.g., in milli-watt to micro-watt range) of the light transmitted by another terminal. Thus, even if only a small portion of the light to be transmitted is leaked into the receive path (e.g., leaked into the wavefront sensor) or interferes with output from the terminal receiver (e.g., terminal 202), noise in the received light signal may be significantly increased and the signal-to-noise ratio of the received signal may be significantly reduced. In many FSOC systems, to avoid the interference of the light to be transmitted with the received light, a FSOC terminal may include separate transmit path and received path, where the light beam to be transmitted and the received light beam may pass through different optical apertures of the FSOC terminal.

Figure 3A:
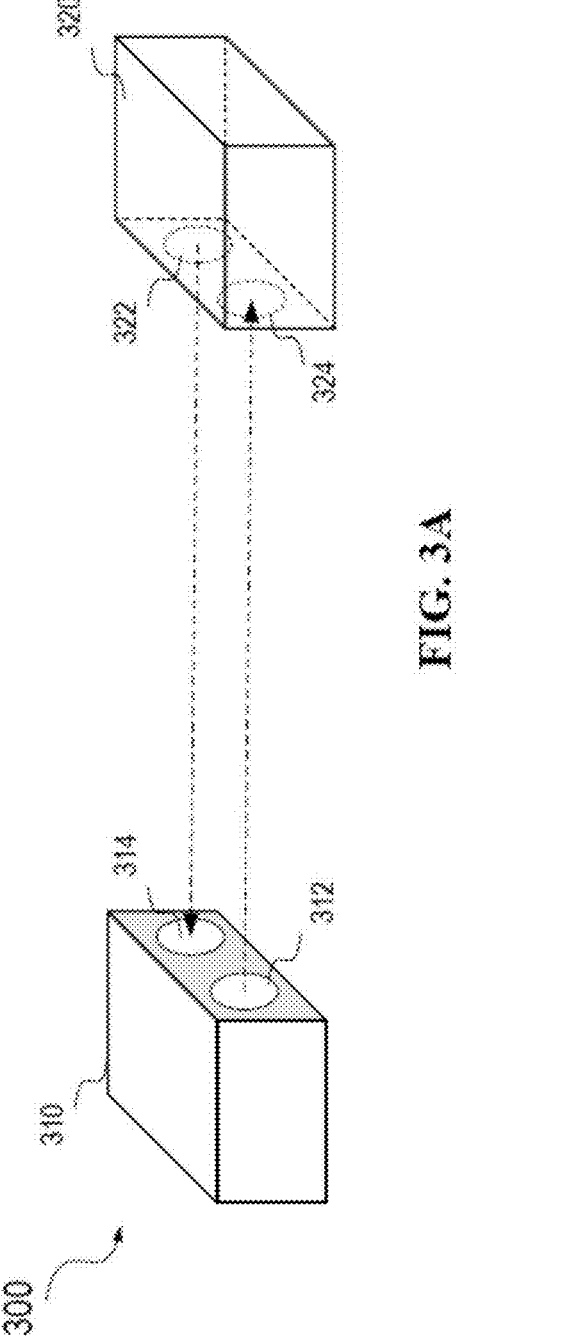
FIG. 3A is an example of a bistatic free-space optical communication system.

FIG. 3A is an example of a bistatic FSOC system 300. In the illustrated example, a first FSOC terminal 310 may include a transmit subsystem 312 and a receive subsystem 314, where transmit subsystem 312 and receive subsystem 314 may use different optical apertures and different optical antennas and other optics. Similarly, a second FSOC terminal 320 may include a transmit subsystem 322 and a receive subsystem 324, where transmit subsystem 322 and receive subsystem 324 may use different optical apertures and different optical antennas and other optics. When a communication link is established between FSOC terminals 310 and 320, transmit subsystem 312 may transmit light signals to FSOC terminal 320, which may receive the light signals from FSOC terminal 310 using receive subsystem 324. Similar, transmit subsystem 322 may transmit light signals to FSOC terminal 310, which may receive the light signals from FSOC terminal 320 using receive subsystem 314.

Since each bistatic FSOC terminal may need to include separate transmit subsystem and receive subsystem, the bistatic FSOC terminal may include more components (e.g., two sets of optical antennas and other optics). As such, the bistatic FSOC terminal may be complex, bulky, heavy, more expensive, and more difficult to steer. For many FSOC terminals, such as airborne FSOC terminals, it is desirable that the FSOC terminal can be smaller, lighter, cheaper, and easier to steer.

Figure 3B:
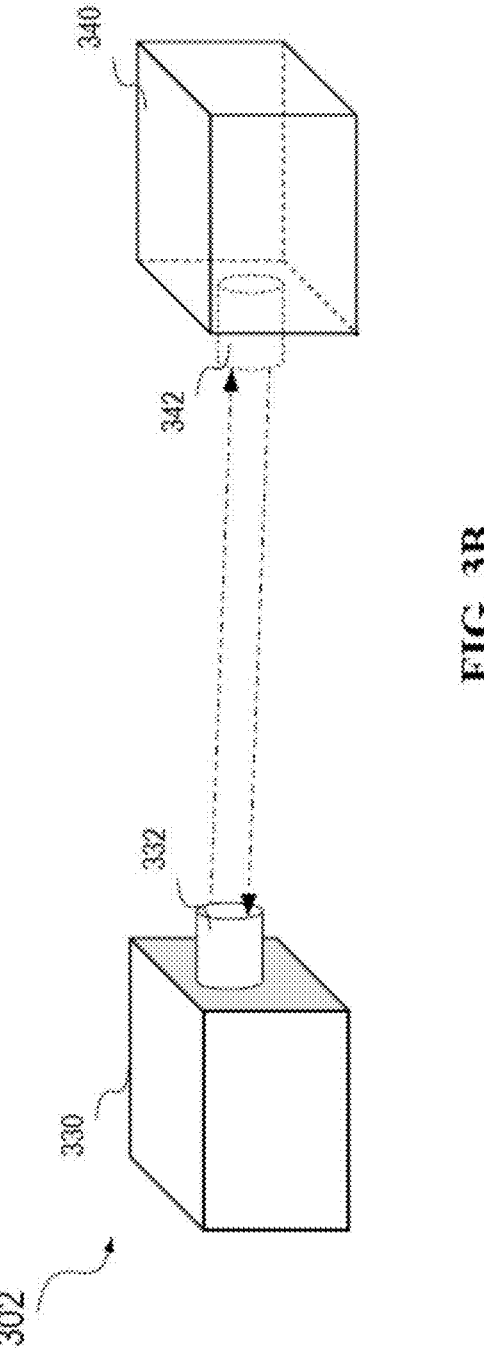
FIG. 3B is an example of a monostatic free-space optical communication system.

FIG. 3B is an example of a monostatic free-space optical communication system 302. In the illustrated example, a first FSOC terminal 330 may include a transceiver system 332, where light to be transmitted into atmosphere and light received from the atmosphere may pass through a common aperture and a common optical path (e.g., a same optical antenna). Similarly, a second FSOC terminal 340 may include a transceiver system 342, where light to be transmitted into atmosphere and light received from the atmosphere may pass through a common aperture and a common optical path. When a communication link is established between FSOC terminals 330 and 340, transceiver system 332 may transmit light signals to FSOC terminal 340 using a light beam in a first infrared wavelength band, and transceiver system 342 of FSOC terminal 340 may receive the light signals transmitted from FSOC terminal 330. Transceiver system 342 of FSOC terminal 340 may simultaneously transmit light signals to FSOC terminal 330 using a light beam in a second infrared wavelength band, and transceiver system 332 of FSOC terminal 330 may receive the light signals transmitted from FSOC terminal 340.

Since each monostatic FSOC terminal as shown in FIG. 3B may use the same optical antenna and some other common optical components for both transmitting optical signals and receiving optical signals, the terminal may use fewer components, and may be less complex, smaller, lighter, cheaper, and easier to steer. However, it can be very challenging to isolate the light signals to be transmitted from the received light signals to prevent the light signals to be transmitted from contaminating the received light signals.

Figure 4:
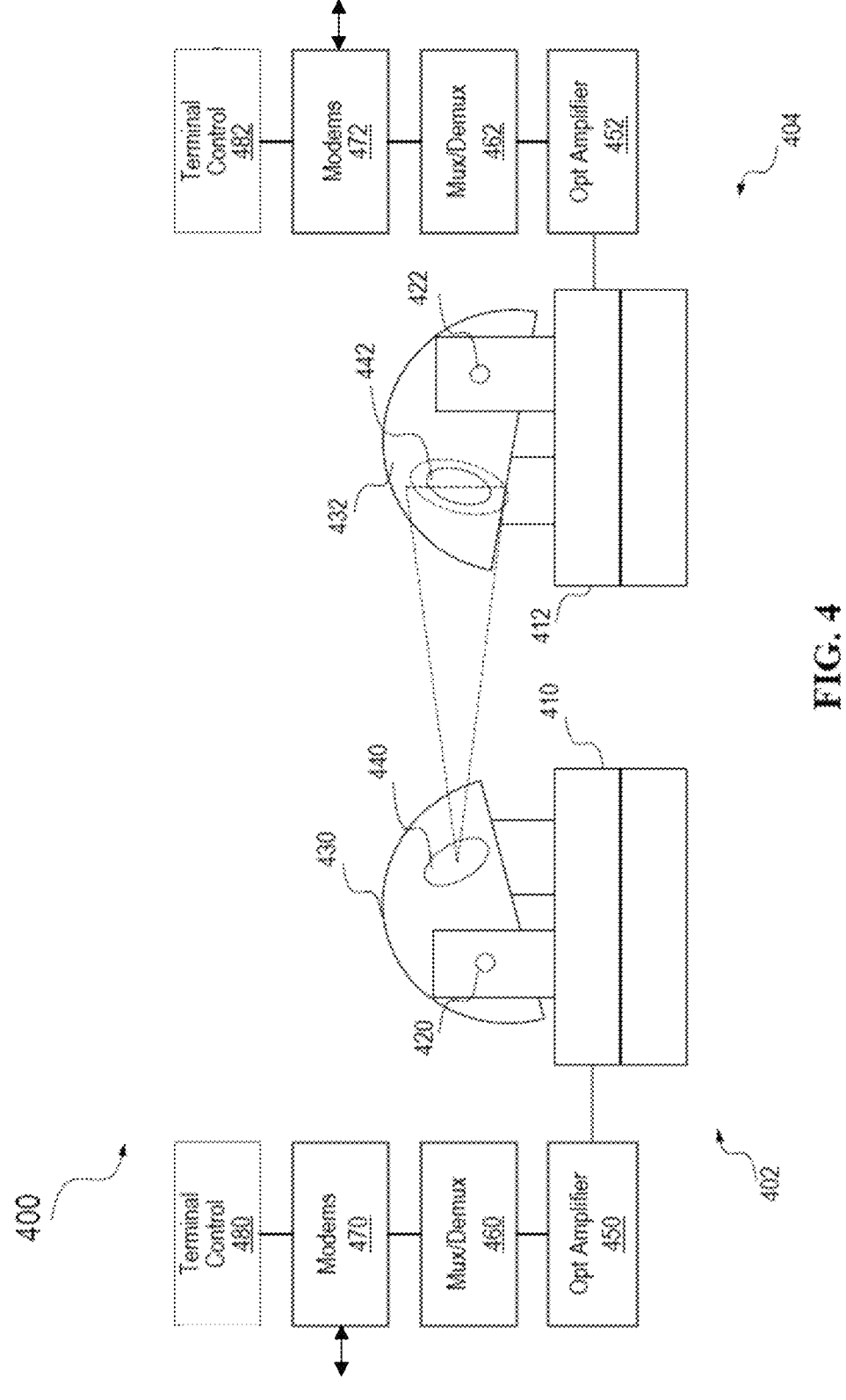
FIG. 4 includes simplified block diagrams of examples of terminals in a free-space optical communication system according to some implementations.

FIG. 4 includes simplified block diagrams of examples of terminals in a free-space optical communication system 400 according to some implementations. A first terminal 402 of FSOC system 400 may include a station 410, which may be fixed or may be steerable (e.g., rotatable). A terminal head 430 of first terminal 402 may be coupled to station 410 through gimbal structure 420, which may pivot, tilt, rotate terminal head 430 and, alone or in combination with station 410, steer terminal head 430 such that a transmit/receive aperture 440 on terminal head 430 of first terminal 402 may face a second terminal 404 for communication with a second terminal 404. Terminal head 430 may include one or more optical antennas for transmitting and/or receiving laser beams, and may also include adaptive optics for aberration correction. For example, first terminal 402 may be a monostatic FSOC terminal as described above with respect to FIG. 3B and described in more detail below. First terminal 402 may include a back end that may include, for example, one or more optical amplifiers 450 (e.g., one or more EDFAs) that may amplify the received light beam or the light beam to be transmitted. A multiplexer/demultiplexer 460 of the back end may multiplex modulated light beams from multiple modulator/demodulators (modems) 470 (and in multiple wavelength bands) into a single light beam to be transmitted, and may demultiplex a received light beam into multiple light beams in different respective wavelength bands, which may then be detected and demodulated by multiple modems 470. The back end of first terminal 402 may also include a terminal control module 480 that may include other circuits, software, and/or firmware, such as network interface cards, network switch, power management circuits, controllers, user interfaces, and the like.

Similarly, second terminal 404 may include a station 412, which may be fixed or may be steerable (e.g., rotatable). A terminal head 432 of second terminal 404 may be coupled to station 410 through a gimbal structure 422, which may rotate terminal head 432 and, alone or in combination with station 412, steer terminal head 432 such that a transmit/receive aperture 442 of second terminal 404 may face first terminal 402 for point-to-point optical communication with first terminal 402. Terminal head 432 may include one or more optical antennas for transmitting and/or receiving laser beams, and may also include adaptive optics for aberration correction. For example, second terminal 404 may be a monostatic FSOC terminal as described above with respect to FIG. 3B and described in more detail below. Second terminal 404 may include a back end that may include, for example, one or more optical amplifiers 452 (e.g., EDFAs) that may be used to amplify the received light beam or the light beam to be transmitted. Second terminal 404 may also include a multiplexer/demultiplexer 462 that may be used to multiplex modulated light beams from multiple modems 472 (and in multiple wavelength bands) into a single light beam to be transmitted, or may demultiplex a received light beam into multiple light beams in different respective wavelength bands, which may be detected and demodulated by multiple modems 472. The back end may also include a terminal control module 482 that may include other circuits, software, and/or firmware, such as a network interface card, a network switch, power management circuits, one or more controllers, a user interface, and the like.

To start a communication link between first terminal 402 and second terminal 404, first terminal 402 may receive information (e.g., location information) of second terminal 404, and may steer terminal head 430 to point to second terminal 404 and transmit a laser beam (e.g., a beacon beam) towards second terminal 404. Additionally or alternatively, second terminal 404 may receive information (e.g., location information) of first terminal 402, and may steer terminal head 432 to point to first terminal 402 and transmit a laser beam towards first terminal 402. First terminal 402 may steer terminal head 430 to try to acquire the laser beam transmitted by second terminal 404 to establish a link between first terminal 402 and second terminal 404. Additionally or alternatively, second terminal 404 may steer terminal head 432 to try to acquire the laser beam transmitted by first terminal 402 to establish a link between first terminal 402 and second terminal 404. Data transmission may begin after the link is established.

During the data transmission, light beams received by the optical antenna of a terminal may be corrected by adaptive optics of the terminal and coupled into a terminal receiver for light detection and signal demodulation as described with respect to, for example, FIG. 2. In many AO systems, the performance of phase-only AO compensation may be limited due to, for example, limited accuracy and/or resolution of the phase aberration estimation or measurement, and/or limited phase compensation range, resolution, accuracy, and speed of the phase compensation components (e.g., deformable mirrors or SLMs). For example, real-time adaptive optics may need to use phase wavefront measurement results, which may be difficult to measure in some communication scenarios. According to certain embodiments, to improve the performance of the adaptive optics system of an FSOC terminal, aberrations in different spatial and/or temporal frequency bands may be corrected using different techniques.

In some implementations, first terminal 402 (e.g., a first transceiver) can receive a stream of a bits (e.g., data packets) for communication across the free-space optical channel to second terminal 404 (e.g., a second transceiver). The free-space optical channel can have a channel bandwidth that is substantially greater than the bandwidth of conventional radio frequency (RF) channels. Accordingly, the free-space optical channel can have the capacity to carry a large amount of data traffic.

In some implementations, the free-space optical channel can be divided into a forward link (for communicating data packets from first terminal 402 to second terminal 404) and a reverse link (for communicating data packets second terminal 404 for first terminal 402). Further, in some implementations, a guard band may be included between the forward link and the reverse link to provide isolation between signals propagating through the forward link and signals propagating through the reverse link.

In some implementations, the optical link of the free-space optical channel is point-to-point communication. That is, for example, first terminal 402 only communicates with one other terminal (e.g., terminal 404) at a time, and vice versa. In some implementations, first terminal 402 can include the ability to re-point to other terminals (e.g., transceivers) at different times.

In some implementations, first terminal 402 and second terminal 404 can be located on ground (or on a ship), in the air, or in space. Accordingly, ground-to-ground links can be formed between ground terminals, ground-to-air links can be formed between ground and air terminals, ground-to-space links can be formed between ground and space terminals, and air-to-space links can be formed between air and space terminals.

Figure 5:
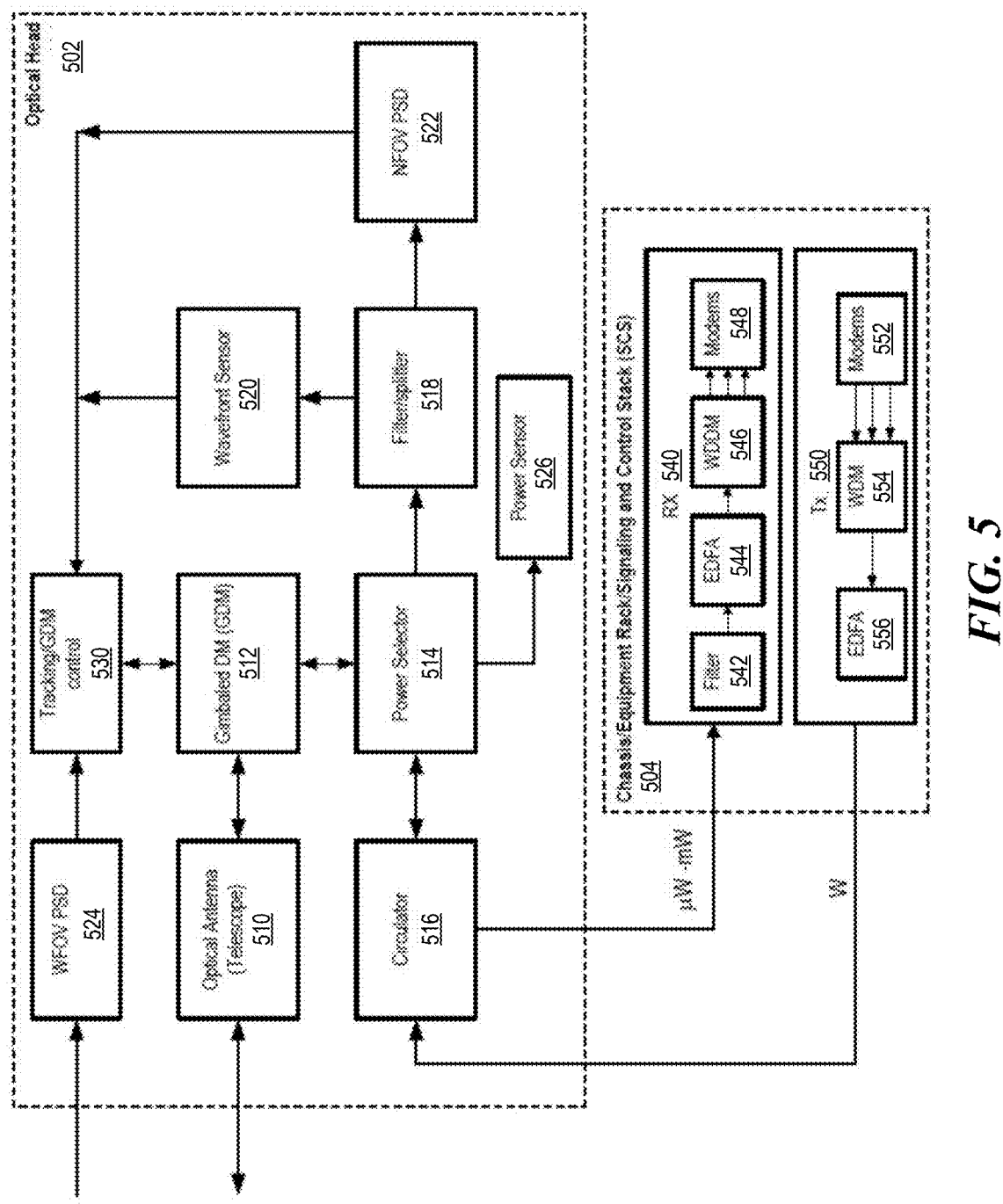
FIG. 5 illustrates a block diagram of an example of a free-space optical communication terminal according to some implementations.

FIG. 5 illustrates a block diagram of an example of a free-space optical communication terminal 500 according to some implementations. In the illustrated example, FSOC terminal 500 may be a monostatic FSOC terminal, and may include an optical head 502 and a chassis 504 (also referred to herein as equipment rack or signaling and control stack (SCS)). It is noted that FIG. 5 is for illustrative purposes only. In various embodiments, some system blocks shown in FIG. 5 may be optional, some other system blocks may be added to FSOC terminal 500, and/or the system blocks of FSOC terminal 500 may be partitioned in different manners. In the illustrated example, optical head 502 may include an optical antenna 510, a gimbaled deformable mirror (GDM) 512, a power selector 514, a circulator 516, a beam splitter 518, a wavefront sensor 520, and a tracking/GDM controller 530. Optical antenna 510 may include one or more telescopes, and may be used to demagnify a received light beam and magnify a light beam to be transmitted. GDM 512 may be used to correct the angle of incidence of the received light beam from optical antenna 510 or the light beam to be transmitted. Power selector 514 may be used to direct a portion of the received light beam to circulator 516, and direct a portion of the received light beam to beam splitter 518. Power selector 514 may also be used to direct a portion of the light beam to be transmitted from circulator 516 to GDM 512. In some implementations, power selector 514 can direct a portion of the light beam to be transmitted to a power meter 526 for measuring the power of the light beam to be transmitted.

Circulator 516 may include at least three ports, where light input from the first port may be output at a second port and light input from a third portion may be output at the first port. Circulator 516 may be used to direct the received light beam from power selector 514 (e.g., optically coupled to the first port of circulator 516 through a collimator and an optical fiber) to a receive subsystem 540 (e.g., optically coupled to the second port of circulator 516 through an optical fiber) of chassis 504 for light signal detection and demodulation. Circulator 516 may also be used to direct the light beam to be transmitted from a transmit subsystem 550 (e.g., optically coupled to the third port of circulator 516 through an optical fiber) of chassis 504 to power selector 514 so that a portion of the light beam to be transmitted may be directed to GDM 512 and optical antenna 510 for transmitting. A collimator (not shown in FIG. 5) or another coupler may be used to focus and couple the received light beam into an optical fiber (not shown in FIG. 5) that may be coupled to a port of circulator 516, and may also be used to collimate a light beam to be transmitted from circulator 516 through the optical fiber. Beam splitter 518 may be used to split a portion of the received light beam from power selector 514 into two beams and direct the two beams toward wavefront sensor 520 and a narrow field of view (NFOV) position sensitive detector (PSD) 522, respectively. Wavefront sensor 520 may include, for example, a Shack-Hartmann wavefront sensor, and may be used to measure the wavefront profile of the received light beam. The measured wavefront profile of the received light beam may be used by tracking/GDM controller 530 to control GDM 512 to correct the wavefront of the received light beam.

In order for two terminals to establish a point-to-point link for data communication, a terminal may need to shine a high-power and broad beacon beam for the other terminal to find, before using narrower beams for high data rate communication. Therefore, in addition to transmitting and receiving light beams for data communication, optical head 502 may include components for acquiring and tracking a beacon beam and controlling actuators to steer optical head 502 until the beacon beam forms an image at the center of a position sensitive detector. Optical head 502 may also include components for transmitting and/or scanning a beacon beam for another terminal to locate FSOC terminal 500. In the example shown in FIG. 5, optical head 502 may include a wide field of view (WFOV) PSD 524 that may have a wider field of view but may have a lower resolution. WFOV PSD 524 may acquire the beacon beam through a separate window. The measurement results of WFOV PSD 524 may be used for coarse beacon beam tracking. NFOV PSD 522 may have a smaller field of view but may have a higher resolution, and the measurement results of NFOV PSD 522 may be used for more accurate beacon beam tracking. In some implementations, GDM 512 may be controlled by tracking/GDM controller 530 for beacon beam acquisition and tracking. For example, GDM 512 may be controlled by tracking/GDM controller 530 to scan a beacon beam to be transmitted within a certain field of regard, such that the transmitted beacon beam may be found by another terminal. GDM 512 may also be controlled to change the wavefront of a beacon beam to be transmitted, so that the beacon beam may be diverged to have a large divergence angle and thus could be acquired by a terminal within a large region. GDM 512 may also be controlled to change the direction of a received beacon beam so that the received beacon beam may be imaged onto a center of NFOV PSD 522.

Chassis 504 may process the received light beam to decode the transmitted data and may generate data modulated light beam for transmitting to another terminal. In chassis 504, the receive path and the transmit path may be separate or may partially overlap. Receive subsystem 540 of chassis 504 may include an optical filter 542, one or more EDFAs 544, a wavelength-division demultiplexer (WDDM) 546, and one or more modems 548. Optical filter 542 may filter out any stray light that is not in the passband of optical filter 542, such as light from the light beam to be transmitted by FSOC terminal 500 or ambient light. The one or more EDFAs 544 may amplify the received light beam that may have a low power. WDDM 546 (e.g., including a grating or a waveguide device) may split the received light beam into multiple beams having light within different respective narrow wavelength ranges. In some implementations, multiple add/drop modules may be used to split the received light beam into multiple beams having light within different respective narrow wavelength ranges, where each add/drop module may "drop" light in a respective narrow wavelength range so that the dropped light may be demodulated by a modem 548 to decode the transmitted data. Each modem 548 may include an optical demodulator and a high-speed photodetector, or may include a high-speed photodetector and an electrical demodulator.

Transmit subsystem 550 of chassis 504 may include one or more modems 552 (e.g., including optical modulators), a wavelength division multiplexer (WDM) 554 (or multiple optical add/drop modules), and one or more EDFAs 556. Modems 552 may be used to modulate laser beams of different respective wavelengths using data to be transmitted. The modulated laser beams may be multiplexed into a single laser beam using WDM 554 or multiple add/drop modules. The output laser beam of WDM 554 may be amplified by one or more EDFAs 556 to boost the power of the light beam to, for example, several watts or several tens of watts. The amplified laser beam may be directed, through circulator 516, to power selector 514, GDM 512, and optical antenna 510 for transmission.

Figure 6:
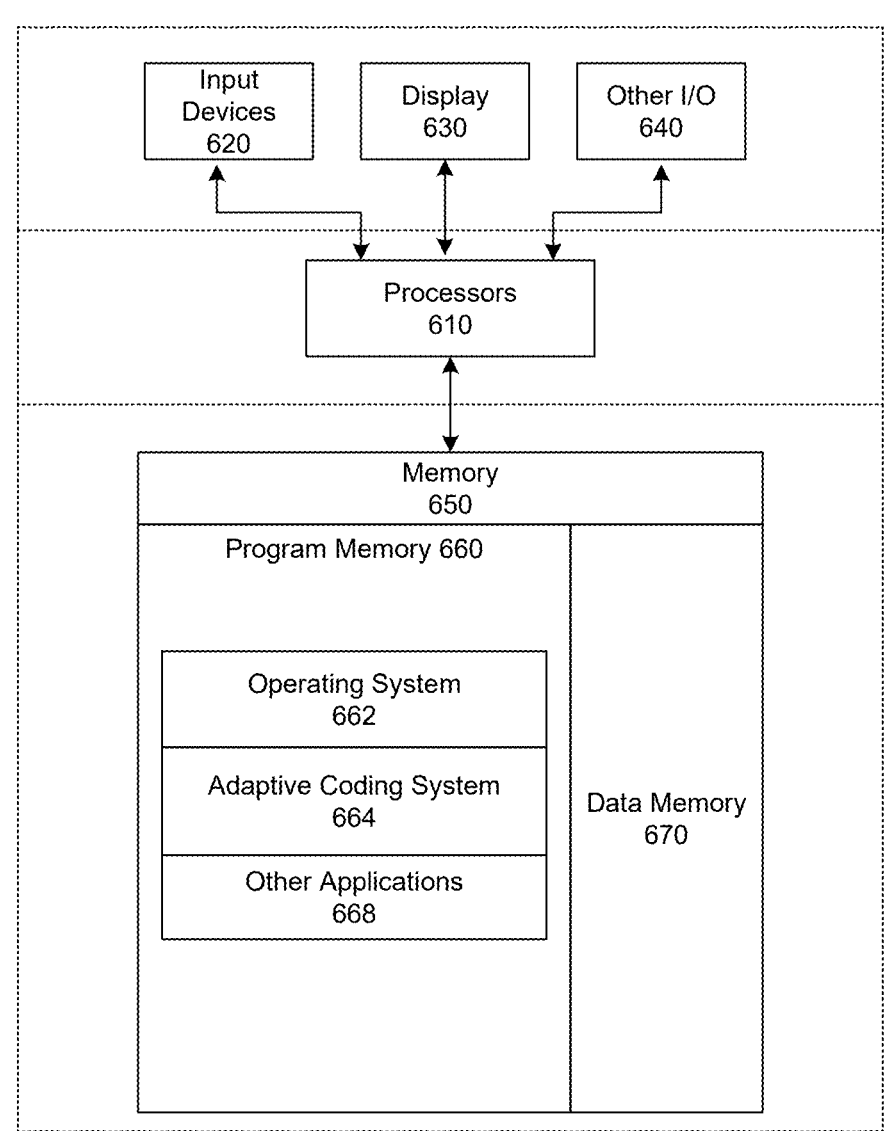
FIG. 6 is a block diagram illustrating an overview of devices on which some implementations can operate.

FIG. 6 is a block diagram illustrating an overview of devices on which some implementations can operate. The devices can comprise hardware components of a device 600 that can provide adaptive coding for transmitted data packets. Device 600 can include one or more input devices 620 that provide input to the Processor(s) 610 (e.g., CPU(s), GPU(s), HPU(s), etc.), notifying it of actions. The actions can be mediated by a hardware controller that interprets the signals received from the input device and communicates the information to the processors 610 using a communication protocol. Input devices 620 include, for example, any of the components and/or hardware described above in relation to FIGS. 1-5, and/or other devices, such as a mouse, a keyboard, a touchscreen, an infrared sensor, a touchpad, a wearable input device, a camera- or image-based input device, a microphone, or other user input devices.

Processors 610 can be a single processing unit or multiple processing units in a device or distributed across multiple devices. Processors 610 can be coupled to other hardware devices, for example, with the use of a bus, such as a PCI bus or SCSI bus. The processors 610 can communicate with a hardware controller for devices, such as for a display 630. Display 630 can be used to display text and graphics. In some implementations, display 630 provides graphical and textual visual feedback to a user. In some implementations, display 630 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 640 can also be coupled to the processor, such as any of the components and/or hardware described above in relation to FIGS. 1-5, and/or other devices, such as a network card, video card, audio card, USB, firewire or other external device, camera, printer, speakers, CD-ROM drive, DVD drive, disk drive, or Blu-Ray device.

In some implementations, the device 600 also includes a communication device capable of communicating wirelessly or wire-based with a network node. The communication device can communicate with another device or a server through a network using, for example, optical communication protocols, such as Synchronous Optical Networking (SONET), Synchronous Digital Hierarchy (SDH), Optical Transport Network (OTN), Asynchronous Transfer Mode (ATM), Ethernet, TCP/IP, and/or the like. Device 600 can utilize the communication device to distribute operations across multiple network devices.

The processors 610 can have access to a memory 650 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 650 can include program memory 660 that stores programs and software, such as an operating system 662, adaptive coding system 664, and other application programs 668. Memory 650 can also include data memory 670, e.g., code rate data, code type data, source data, error correction data, repair packet data, data packets, channel characteristic data, transmission condition data, configuration data, settings, user options or preferences, etc., which can be provided to the program memory 660 or any element of the device 600.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 7:
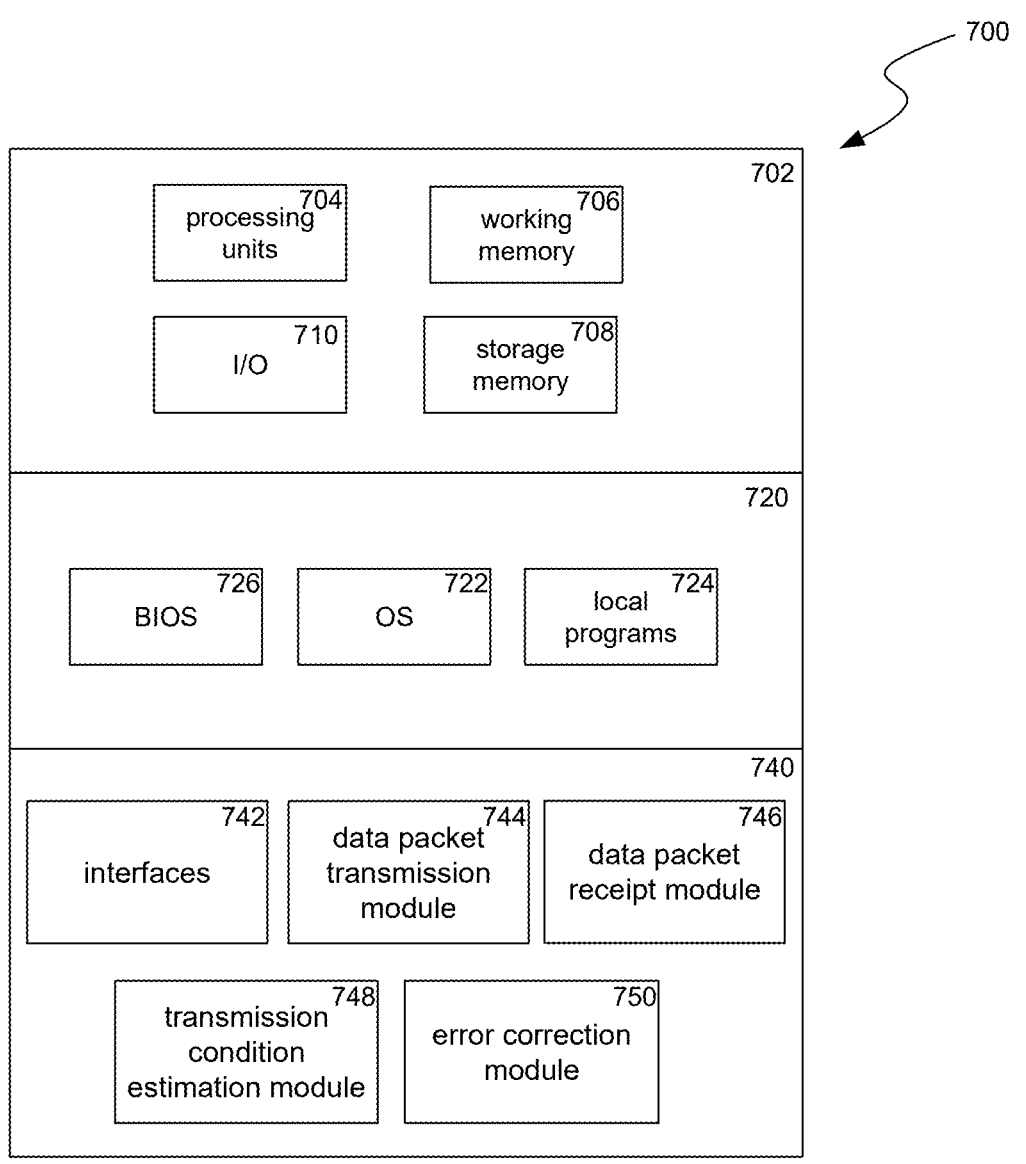
FIG. 7 is a block diagram illustrating components which, in some implementations, can be used in a system employing the disclosed technology.

FIG. 7 is a block diagram illustrating components 700 which, in some implementations, can be used in a system employing the disclosed technology. The components 700 include hardware 702, general software 720, and specialized components 740. As discussed above, a system implementing the disclosed technology can use various hardware including processing units 704 (e.g., CPUs, GPUs, APUs, etc.), working memory 706, storage memory 708, and input and output devices 710. In various implementations, storage memory 708 can be one or more of: local devices, interfaces to remote storage devices, or combinations thereof. For example, storage memory 708 can be a set of one or more hard drives (e.g., a redundant array of independent disks (RAID)) accessible through a system bus or can be a cloud storage provider or other network storage accessible via one or more communications networks (e.g., a network accessible storage (NAS)). Components 700 can be implemented in a client computing device or on a server computing device.

General software 720 can include various applications including an operating system 722, local programs 724, and a basic input output system (BIOS) 726. Specialized components 740 can be subcomponents of a general software application 720, such as local programs 724. Specialized components 740 can include data packet transmission module 744, data packet receipt module 746, transmission condition detection module 748, error correction module 750, and components which can be used for providing user interfaces, transferring data, and controlling the specialized components, such as interfaces 742. In some implementations, components 700 can be in a computing system that is distributed across multiple computing devices or can be an interface to a server-based application executing one or more of specialized components 740. Although depicted as separate components, specialized components 740 may be logical or other nonphysical differentiations of functions and/or may be submodules or code-blocks of one or more applications.

Data packet transmission module 744 can cause a first transceiver to transmit a first series of data packets to a second transceiver over a communications channel. In some implementations, data packet transmission module 744 can encode the first series of data packets, according to a determined code rate, with one or more error correction bits. The code rate can be, for example, a ratio of bits carrying source data to total bits in a data packet. Thus, a data packet having 2 error correction bits and 6 bits of source data can have a code rate of 6/8. In some implementations, data packet transmission module 733 can cause the first transceiver to transmit the first series of data packets via an optical signal, such as a laser beam, as described further herein. In some implementations, the communications channel can be a free-space optical communication channel. In some implementations, the first and second transceivers can be included in respective free-space optical terminals. Further details regarding transmitting a first series of data packets from a first transceiver to a second transceiver are described herein with respect to block 802 of FIG. 8.

Data packet receipt module 746 can receive, via the communications channel, a second series of data packets from the second transceiver. In some implementations, data packet receipt module 746 can receive the second series of data packets via an optical signal, such as a laser beam, as described further herein. Further details regarding receiving, via a communications channel, a second series of data packets from a second transceiver are described herein with respect to block 804 of FIG. 8.

Transmission condition estimation module 748 can estimate, based at least partially on one or more characteristics of the second series of data packets received by data packet receipt module 746, one or more transmission conditions of the communications channel. The characteristics of the second series of data packets can include, for example, corruption of one or more data packets and/or one or more bits within respective data packets. In some implementations, the characteristics of the second series of data packets can include a percentage of corrupted data packets and/or corrupted bits within respective data packets. Based at least partially on such characteristics of the second series of data packets, transmission condition detection module 748 can determine, for example, low or fluctuating receipt power for the second series of data packets, deteriorated channel quality for the communications channel over which the second series of data packets was received, etc. In some implementations, transmission condition detection module 748 can identify particular causes for the detected transmission conditions of the communications channel, although it is contemplated that such identification is not necessary to perform the functions described herein. Further details regarding detecting, based at least partially on one or more characteristics of a received second series of data packets, one or more transmission conditions of a communications channel are described herein with respect to block 806 of FIG. 8.

Error correction module 750 can, based on the one or more transmission conditions of the communications channel detected by transmission condition detection module 748, perform one or more preemptive and/or proactive actions relative to the first series of data packets and/or future series of data packets to be transmitted. In some implementations, error correction module 750 can retransmit all or portions of the first series of data packets, such as based on a determination that the data channel was impaired above a threshold level and that the first series of data packets was within the communications channel at the same time, or within a threshold period of time, as the second series of data packets. In some implementations, error correction module 750 can transmit one or more repair packets for one or more data packets of the first series of data packets. In some implementations, the repair packets can include repair bits for a data packet of the first series of data packets, either included in a partial or full retransmission of the data packet, or included in a future data packet to be transmitted. In some implementations, error correction module 750 can adapt the code rate, for future series of data packets to be transmitted to the second transceiver, by modifying the proportion of one or more bits that carry source data to total bits in the data packets, such as by increasing or decreasing the number of error correction bits included in the data packets. Further details regarding sending correction information for one or more data packets of the first series of data packets and/or modifying one or more future transmission characteristics of a communications channel are described herein with respect to block 808 of FIG. 8.

FIG. 8 is a flow diagram illustrating a process 800 used in some implementations for providing adaptive coding for transmitted data packets. In some implementations, process 800 can be performed as data packets are being transmitted and received across the communications channel. In some implementations, one or more of the components described herein can execute one or more of the steps of process 800. In some implementations, process 800 can be performed by components of a communications terminal, such as a free-space optical communication (FSOC) terminal described herein (e.g., FSOC terminal 900 of FIG. 9). In some implementations, process 800 can be performed by adaptive coding system 664 of FIG. 6. In some implementations, process 800 can be performed by components 700 of FIG. 7. In some implementations, process 800 can be performed by terminal 910 (or one or more components of terminal 910) of FIG. 9.

At block 802, process 800 can transmit, via a communications channel (e.g., an FSOC channel), a first series of data packets. In some implementations, the first series of data packets can be transmitted by a first transceiver to a second transceiver across the communications channel, e.g., first and second FSOC terminals as described further herein. In some implementations, the optical channel can be asymmetrical for forward channel links (i.e., transmissions) and reverse channel links (i.e., receptions) between transceivers, as described further herein, thereby causing potentially large variability in channel characteristics. In some implementations, the optical channel can be long, e.g., having a transmission-to-receipt latency on the order of hundreds of milliseconds. In some implementations, the first transceiver can be an optical transceiver included in an optical ground station, and the second transceiver can be an optical transceiver included in a satellite terminal, or vice versa, thereby having potentially rapidly changing channel characteristics based on atmospheric conditions. In some implementations, the communications channel can be an optical channel and/or FSOC channel having substantially greater channel bandwidth than conventional radio frequency (RF) channels, and thereby having the capacity to carry a large amount of data traffic.

The first series of data packets can have a code rate corresponding to a proportion of one or more bits that carry source data to total bits in respective data packets of each data packet of the first series of data packets. In some implementations, the first series of data packets can include one or more error correction bits (e.g., one or more bits redundant with the source data), such that one or more corrupted source bits can be corrected by the second transceiver by applying functions using the error correction bits. For example, if the first series of data packets includes no error correction bits, the code rate can be 7/7. In another example, if the first series of data packets include two error correction bits per data packet, the code rate can be 5/7 (i.e., 5 source bits to 7 total bits, the total bits including 2 error correction bits). In some implementations, an FSOC channel's large throughput capacity can be utilized to adaptively control coding of bits transmitted across the channel, as described further herein.

At block 804, process 800 can receive, via the communication channel, a signal corresponding to a second series of data packets. In some implementations, the second series of data packets can be received from the second transceiver to which the first series of data packets were transmitted. Exemplary transmission and receipt of data packets by FSOC terminals is shown and described herein with respect to FIG. 10A.

At block 806, process 800 can estimate, based at least partially on one or more characteristics of the received signal corresponding to the second series of data packets, one or more transmission conditions of the communications channel. In some implementations, the one or more characteristics can include corruption of at least one data packet of the second series of data packets. In some implementations, process 800 can determine corruption of a data packet by determining that the data packet (or one or more bits of the data packet) were not successfully received, that the data packet was not successfully decoded, that the data packet was unsuccessfully corrected by the first transceiver, and/or by detecting one or more other errors in the data packet indicating that it is different than what was transmitted by the second transceiver. In some implementations, process 800 can determine corruption of a data packet by determining a hash and/or based on one or more parity bits.

In some implementations, estimating the one or more transmission conditions can include determining that the communications channel is degraded based on the one or more characteristics of the received second series of data packets, e.g., by detecting lost data. In some implementations, detecting the one or more transmission conditions can include detecting a level of degradation of the communications channel, e.g., based on packet failure rate, such as by detecting a number and/or ratio of corrupted bits and/or corrupted data packets relative to successfully received, demodulated, and/or decoded bits and/or data packets in the second series of data packets. In some implementations, estimating the one or more transmission conditions can include detecting variable and/or diminished receipt power by the first transceiver based on the received second series of data packets. In some implementations, estimating the one or more transmission conditions can include determining that a probability of channel degradation is above a threshold (e.g., 75%) based on one or more of such transmission conditions.

Although described primarily herein as detecting transmission conditions based on characteristics of the second series of data packets, it is contemplated that process 800 can alternatively and/or additionally detect transmission conditions based on data from one or more other sources. For example, in some implementations, process 800 can detect transmission conditions based on data obtained from one or more scintillometers, reports from neighboring terminals communicating over similar channels, ingested forecast data regarding any part of the transmit path, wind speed data, etc.

At block 808, process 800 can, based on the detected one or more transmission conditions of the communications channel, perform a proactive and/or preemptive action relative to the first series of data packets and/or a future series of data packets to be transmitted, thereby adapting to changes in the communications channel. In some implementations, such an action can be performed prior to receiving any information derived by the second optical transceiver from its reception of attempted reception of the first series of data packets. In some implementations, this information can include an acknowledgment (which, in some implementations, can indicate successful or failed receipt and/or decoding, e.g., via a positive or negative ARQ) of one or more data packets of the first series of data packets sent by the second transceiver. In some implementations, this information can include an error rate or sequence number, a count of bad packets, etc.

Thus, in some implementations, process 800 need not wait to receive characterization of the communications channel by the second transceiver based on receipt and/or decoding of the first series of data packets, as the characteristics of the communications channel could have entirely changed by the time such information is received at the first transceiver. In some implementations, process 800 can perform the proactive and/or preemptive action prior to the second transceiver receiving the first series of data packets (e.g., on the order of hundreds of milliseconds). In contrast, process 800 can perform the proactive and/or preemptive action on the order of microseconds. Thus, process 800 can avoid unnecessary delays in the second transceiver successfully receiving, decoding, and transmitting back status information for the first series of data packets (or future series of data packets).

In various implementations, process 800 can perform a proactive and/or preemptive action relative to the first series of data packets until process 800 determines, based on received data, that conditions of the communication channel have improved and/or until the second transceiver acknowledges successful receipt and/or decoding of the first series of data packets. In some implementations, process 800 can throttle incoming data from the second optical transceiver while performing the proactive and/or preemptive action relative to the first series of data packets and/or the future series of data packets to be transmitted, thereby providing greater channel capacity for such actions. For example, process 800 can buffer incoming data until channel capacity becomes available.

In some implementations, process 800 can send correction information relevant to one or more data packets, of the first series of data packets, to the second transceiver. For example, process 800 can retransmit the one or more data packets of the first series of data packets to the second transceiver via the communications channel. An exemplary retransmission of a data packet from a transmitting terminal to a receiving terminal is shown and described herein with respect to FIG. 10B. Although referred to in some passages herein as transmitting correction information relevant to one or more "first" data packets of the first series of data packets for clarity and differentiation, it is contemplated that the one or more "first" data packets are not necessarily the initial data packets of the first series of data packets, and can correspond to any data packets at any location within the first series of data packets.

In another example, process 800 can transmit to the second transceiver one or more repair packets, corresponding to timing of the received one or more second series of data packets, for the first series of data packets. In some implementations, the repair packets can include parity data that the second transceiver can use to repair and/or recover data in the first series of data packets, which, in some implementations, can be appended to retransmitted source data. In some implementations, a single repair packet or multiple repair packets can be used by the second transceiver to fix one or more data packets of the first series of data packets.

In some implementations, process 800 can identify the one or more data packets to retransmit and/or which repair packets (corresponding to one or more previously transmitted data packets) to send based on their time of transmission, as compared to a time of transmission and/or receipt of one or more corrupted data packets of the second series of data packets. For example, process 800 can identify the data packets to resend and/or repair based on their transmission timestamps being within a threshold period of time of the transmission and/or receipt timestamps of the one or more corrupted data packets. In some implementations, process 800 can identify the data packets to resend and/or repair based on a determination that the data packets were in the communications channel at the same time as the one or more corrupted data packets, and/or were within the atmosphere at the same time as the one or more data packets. In some implementations, process 800 can analyze the second series of data packets to determine a period of time in which data packets of the first series of data packets were likely to have been unsuccessfully received, such as a period of time in which data packets of the second series were corrupted and/or when receipt power was diminished.

In some implementations, process 800 can modify one or more future transmission characteristics of the communications channel, i.e., perform forward error correction (FEC). For example, process 800 can adapt at least one of the code rate, code type modulation, transmit power, baud rate, etc., for one or more third data packets or series of data packets (or further future data packets) to be transmitted to the second transceiver. In another example, process 800 can modify interleaving type or characteristics for the third series of data packets. Interleaving can increase resilience against burst errors and/or erasures by intermixing code blocks to that the burst gets spread out. When adapting the code rate for the future data packets, process 800 can modify the proportion of one or more bits that carry source data to total bits in respective data packets. For example, if the code rate is 5/7, for every 5 bits of source data, the coder generates a total of 7 bits of data, of which 2 bits are redundant information.

In some implementations, each respective data packet can include, based on the detected one or more transmission conditions of the communications channel, at least one error correction bit in the total bits of the data packet (e.g., one or more bits redundant with source bits). In some implementations, process 800 can modify the code rate for the third series of data packets to include parity bits that the second transceiver can use to repair one or multiple data packets, e.g., one or more data packets of the third series of data packets and/or one or more data packets within the previously transmitted first series of data packets, with or without identification of particular data packets that are likely to be lost as described above.

In some implementations, the third series of data packets can include an error or erasure code. In some implementations, the utilized error or erasure code can be rateless, i.e., process 800 can modify the code rate without resetting the code state, which would potentially require starting a new coding window or new coding sequence. In some implementations, the utilized error or erasure code can be "windowless," i.e., support very long encoding windows (e.g., above a threshold encoding window, which is greater than typical encoding window) in that it is capable of repairing errors or erasures from any data that was submitted to the encoder prior to the encoding of the third series of data packets, including those transmitted long before the third series of data packets. A decoder of the second transceiver can then use the error correction bits in the third series of data packets to repair one or more erased or damaged source data packets, either within the third series of data packets, in the first series of data packets, or any other time prior.

In some implementations, coding of the stream of bits before transmission adds redundancy to the data packets that can provide a greater likelihood that the data packets can be successfully received and decoded at the other end of the communications link (i.e., by the second transceiver). Forward error correction (FEC) is a method of obtaining error control in data transmission in which the source (transmitter) sends redundant data and the destination (receiver) selectively uses that redundant data to correct errors or erasures detected by the receiver. During the transmission, the data packets (i.e., stream of bits) may be corrupted by interference (changes from 0 to 1, or 1 to 0). The redundant error correction bits can be used at the receiver (i.e., second transceiver) for restoring corrupted bits.

The inclusion of the redundant bits can increase the total number of bits required to be transmitted as compared to the transmission of the uncoded stream of bits. However, the coded stream of bits can be more likely to be successfully received and decoded by the second transceiver. In other words, adaptive inclusion of redundant bits with the stream of bits can increase the channel throughput needed to communicate the coded stream of bits, but also increases the likelihood that the coded stream of bits will be successfully communicated across the optical link.

In some implementations, the available throughput of the optical channel can be used to set the coding of the stream of bits to be transmitted by process 800. That is, the stream of bits without any coding can occupy a set amount of the throughput when transmitted across the free-space channel. In some implementations, coding of the stream of bits before being transmitted across the communications channel can be selected to cause the coded stream of bits to occupy (utilize) a selected amount of the available throughput when transmitted across the free-space optical channel. In some implementations, the code rate can be selected so that the coded stream of bits occupies substantially all the available throughput of the free-space optical channel. In some implementations, the code rate can be selected to utilize or fill a predetermined amount of the available throughput. Thus, in some implementations, process 800 can adaptively code data packets based at least on the available throughput of the free-space optical channel. In some implementations, the amount of the communications channel available to be utilized could be based on characteristics of the channel itself (e.g., determined at block 806), based on limitations of transceiver and other terminal hardware, based on regulatory limits, etc.

Although primarily described herein as adapting the code rate based on diminished transmission conditions, it is contemplated that process 800 can conversely adapt the code rate based on improved transmission conditions. For example, upon detection by process 800 that receipt power has improved and/or fewer or no corrupted data packets are being received, process 800 can increase the code rate to include greater source bits and fewer or no error correction bits or parity bits. Similarly, process 800 can cease to transmit repair packets and/or not retransmit source data packets based on detected improved transmission conditions.

Although described primarily herein relative to "bits," it is contemplated that the implementations described herein can be similarly applied relative to "blocks," which can be used interchangeably with the term "packets" in some implementations. As used herein, a "block" can include multiple bits, e.g., 100 million bits. In some implementations, each block can be the same size, although the blocks can be different sizes in other implementations.

Although shown and described herein as being performed in one iteration, it is contemplated that process 800 can be performed multiple times, simultaneously, concurrently, and/or subsequently as data packets are being transmitted and received, and/or as channel characteristics are changing. Further, it is contemplated that block 808 can be additionally performed based on a negative acknowledgment received from the second transceiver, despite proactive and/or preemptive measures being taken to avoid unsuccessful receipt, demodulation, and/or decoding by the second transceiver.

Figure 9:
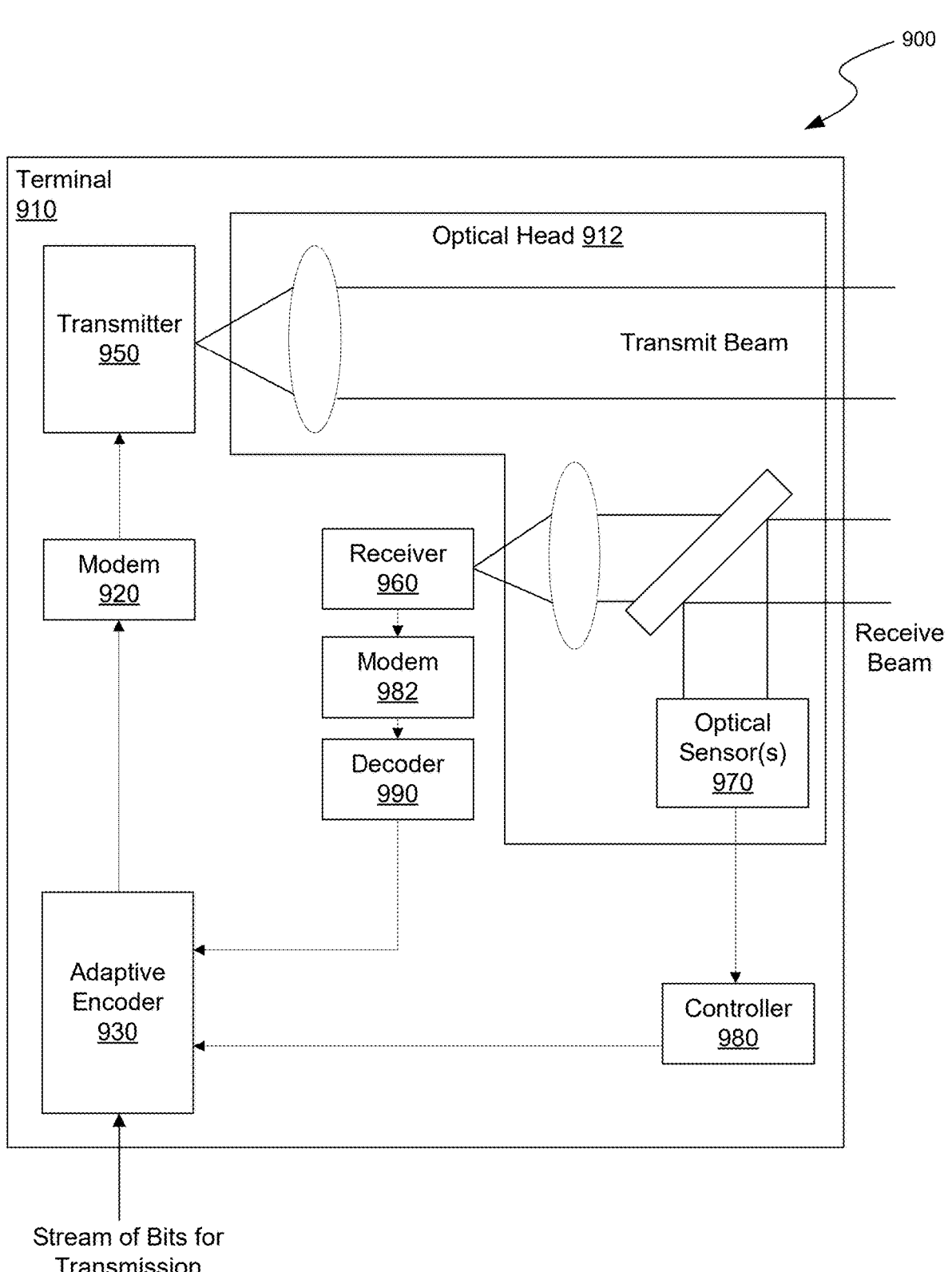
FIG. 9 is an example of an optical terminal that includes an adaptive encoder for adaptively encoding data packets for transmission based on characteristics of received data packets.

FIG. 9 is an example 900 of an optical terminal 910 that includes an adaptive encoder 930 for adaptively encoding data packets for transmission, by transmitter 950, based on characteristics of data packets received by receiver 960. In some implementations, optical terminal 910 can perform process 800 of FIG. 8. In some implementations, adaptive encoder 930 can perform at least a portion of process 800 of FIG. 8. In some implementations, adaptive encoder 930 can be similar to adaptive coding system 664 of FIG. 6. In some implementations, adaptive encoder can be embodied by components 700 of FIG. 7. In some implementations, the logic of adaptive encoder 930 can be embodied on a computer-readable storage medium or a field programmable gate array circuit.

When implementing flexible rate or rateless forward error correction (FEC), in some implementations described herein, adaptive encoder 930 can vary the code rate for data packets to be transmitted by transmitter 950. In some implementations, adaptive encoder 930 can select the code rate based on past or future expected transmission conditions of the communications channel. Modem 920 can modulate an optical signal with the coded stream of bits, and transmitter 950 can provide the modulated optical beam to optical head 912 for transmission of the optical beam through a communications channel, such as a free-space optical communication (FSOC) channel.

In some implementations, adaptive encoder 930 can use locally determined characteristics of received data packets received by receiver 960 (e.g., received power level, percentage of corrupted packets, etc.) to determine the code rate. In some implementations, although not necessary, adaptive encoder 930 can further use packet acknowledgments and/or channel characteristics determined by the receiving terminal (not shown) and transmitted back to terminal 910. However, due to the length of the transmission path between terminal 910 and the receiving terminal (and vice versa), such metrics may be delayed by hundreds of milliseconds, and may not reflect current atmospheric conditions due to its variability and constantly changing characteristics. In either implementation, adaptive encoder 930 assumes reciprocity of the free-space optical channel. That is, adaptive encoder 930 assumes a correlation between transmit and receive characteristics of a transmit optical beam and a receive optical beam that have both traveled through the free-space optical channel.

However, some other locally determined metrics do not necessarily assume channel reciprocity. In some implementations, terminal 910 can include one or more local sensors, such as, optical sensor(s) 970. For example, optical sensor(s) 940 can include a beam position detector (e.g., a two-dimensional position sensitive detector or an optical quad-cell detector), and/or a Shack Hartmann sensor that measures the energy of a sensed optical beam relative to a beam focus. In some implementations, optical sensor(s) 940 can include a power meter configured to receive a portion of the received laser beam and measure its power, which may be indicative of reduced receive power over a period of time. Thus, optical sensor(s) 970 can alternatively or additionally be employed to characterize the channel locally. In some implementations, the parameters of the receive beam sensed by optical sensor(s) 970 can be provided to controller 980, which can then provide such channel characteristics to adaptive encoder 930.

Receiver 960 can provide a received, modulated signal to modem 982, which can demodulate the received stream of bits. Decoder 990 can decode the demodulated stream of bits and, in some implementations, provide the decoded stream of bits to adaptive encoder 930. Adaptive encoder 930 can then detect characteristics of the decoded stream of bits, such as corruption of bits, a percentage of corrupted bits, etc., indicative of transmission conditions of the free-space optical channel. In some implementations, modem 982, decoder 990, modem 920, and adaptive encoder 930 can together make up a "transceiver," such as is described further herein.

In some implementations, locally generated characteristics of a receive beam can provide preemptive code rate control. For example, for some optical links, such as ground-to-space (in which the space terminal is a MEO or GEO satellite) the locally generated characteristics can provide the transmitting terminal (i.e., terminal 910) with advance notice of a channel degradation, well before the receiving terminal can send a "packet failure rate," "received power level," ARQ, or other similar metric indicating the characteristics of the channel (and thus the likelihood of reception). As described herein, the locally generated characteristics can come from observations and sensing of the transmitting terminal (i.e., terminal 910). Thus, terminal 910 can have access to channel state information up to tens or hundreds of milliseconds before the receiving terminal could deliver a message to the terminal 910. Therefore, adaptive encoder 930 can adjust the code rate to retransmit data packets, send more repair packets, and/or adjust the code rate to address recently transmitted packets or future packets that have higher likelihood of corruption.

Specifically for ground-to-space optical links (e.g., to satellites), almost all of the degradation of the optical signal or beam occurs during the heavier part of the atmosphere, which makes up tens of kilometers of the thousands of kilometers path length, or between 0.05% to 5% of the path, and all of that is at one end, which is next to the ground terminal (e.g., terminal 910). Packets (e.g., stream of bits) transmitted from the ground terminal of the optical ground-to-space link may become corrupted, with that corruption likely happening nearly immediately after being transmitted. However, the receiver (e.g., space-to-ground terminal) may not detect that corruption until much later (several to many milliseconds). But, as those ground-to-space outgoing packets (e.g., stream of bits) are getting corrupted, there is a very high chance that the incoming reception at that same time will be damaged or that internal sensors (e.g., optical sensor(s) 970) in the ground-to-space terminal will detect the diminished channel characteristics. The ground terminal of the ground-to-space optical links can then immediately insert additional repair packets, adjust the code rate, and/or perform source packet repetition (if doing replication). In some implementations, the adjustment of the code rate can also account for channel assessment, including how likely packets are failing reception, duration of deep fades, depth of fades, etc., which can be used to control interleaving and forward error correction (FEC) block (source) size.

In some implementations, available throughput capacity of the optical channel can additionally be used to adaptively control the coding of the stream of bits. For example, coding of the stream of bits (before being transmitted across the free-space optical channel) can be selected to cause the coded stream to utilize a selected amount of the available throughput, such as substantially all of the available throughput. Accordingly, in some implementations, the transmitting terminal (e.g., terminal 910) can throttle (adjust) the incoming data rate (reduce the data rate) to provide even more room for repair packets within the available capacity of the free-space optical channel.

Figure 10A:
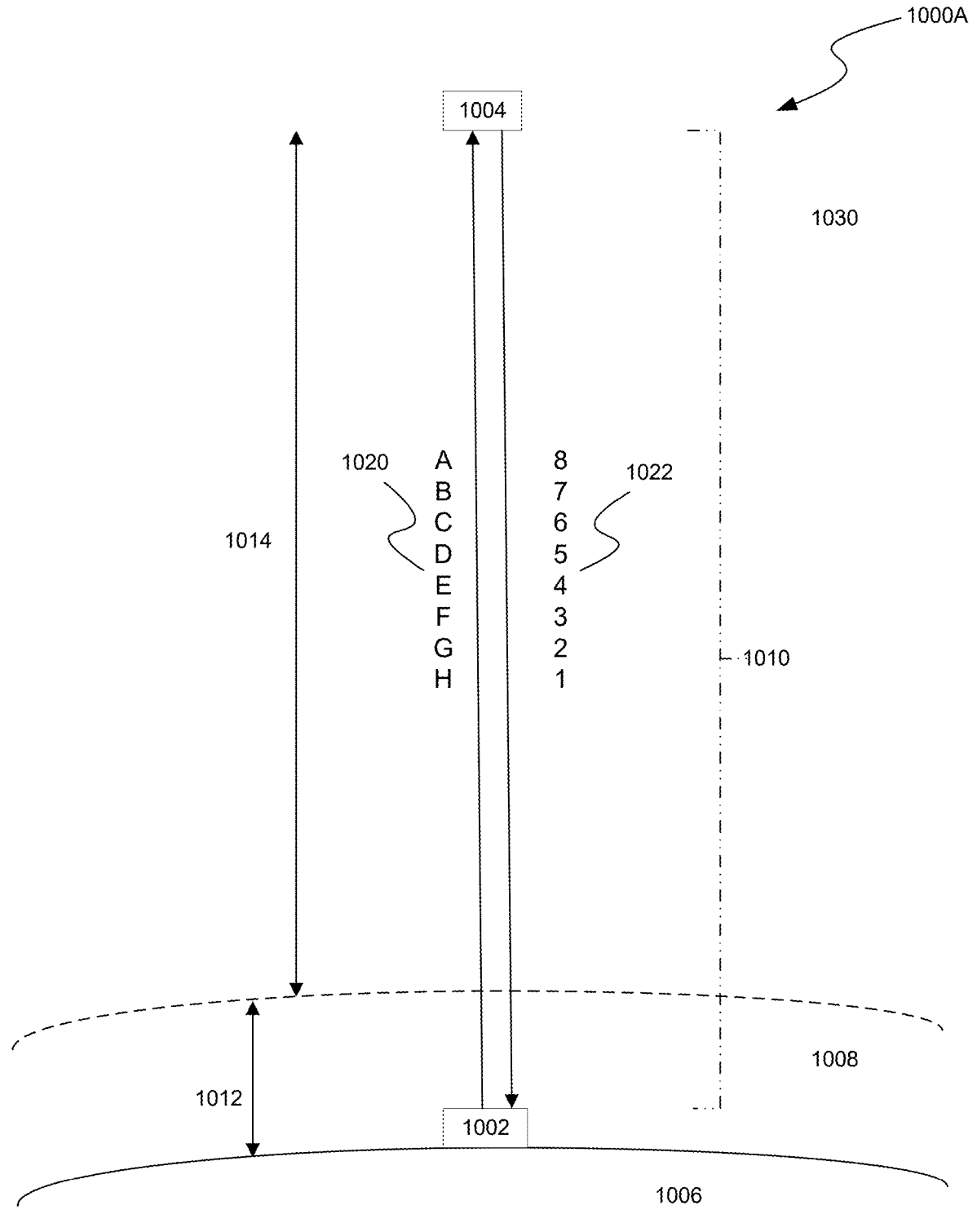
FIG. 10A illustrates an example of a ground-to-space and/or space-to-ground free-space optical channel through which data blocks are transmitted and received.

FIG. 10A illustrates an example 1000A of a ground-to-space and/or space-to-ground free-space optical channel 1010 through which data packets are transmitted and received according to some implementations. First terminal 1002 (e.g., a first transceiver) can be located, for example, on earth 1006, while second terminal 1004 (e.g., a second transceiver) can be located, for example, in space 1030, or vice versa. Accordingly, the latency of the communication of data packets from first terminal 1002 to second terminal 1004, and vice versa, is relatively long.

Some communications systems use the reception of signals from a transceiver at the other end of the channel to characterize the quality of the channel. For example, the first terminal 1002 could receive signals transmitted from the second terminal 1004 to characterize the free-space optical channel. However, if the free-space optical channel is too long, then the characteristics of the channel may change between the time a known signal transmitted from the second terminal 1004 is received by the first terminal 1002.

As described further herein, in some cases, the time between when the channel characteristics are locally determined and when the determined channel characteristics are used to adaptively select the encoding of the stream of bits, can be less that the time it takes for the optical characteristics of the free-space optical channel to change. In some cases, the time between when the channel characteristics are locally determined and when the determined channel characteristics are used to adaptively select the encoding of the stream of bits, can be less than the time it takes for an optical beam to propagate through the free-space optical channel. In other words, in some cases, the time between when the channel characteristics at a particular past time are locally determined and when the determined channel characteristics are used to adaptively select the encoding of the stream of bits, can be less than the time it takes for the receiving terminal to receive a data packet. In some cases, the time between when the channel characteristics are locally determined and when the determined channel characteristics at a particular past time are used to adaptively select the encoding of the stream of bits, can be less than the time it takes for the transmitting terminal to receive a positive or negative acknowledgment from a receiving terminal of a data packet sent that that past time, and/or for the receiving terminal to report channel characteristics at that past time to the transmitting terminal (e.g., a received power level).

In FIGS. 10A-10D, free-space optical channel 1010 can be a ground-to-space and/or space-to-ground free-space optical channel that can include rapidly changing portion 1012 and stable portion 1014. The rapidly changing portion 1012 can be located, for example, within atmosphere 1008 of earth 1006, which may include rapidly changing conditions. However, stable portion 1014 can be located, for example, in space which generally mimics a vacuum. Accordingly, rapidly changing portion 1012 of free-space optical channel 1010 is located proximate to first terminal 1002. In example 1000A, a forward link stream of bits 1020 (represented by ABCDEFGH) propagates through the forward direction of free-space optical channel 1010 from first terminal 1002 to second terminal 1004. A reverse link stream of bits 1022 (represented by 12345678) propagates through the reverse direction of free-space optical channel 1010 from second terminal 1004 to first terminal 1002.

Figure 10B:
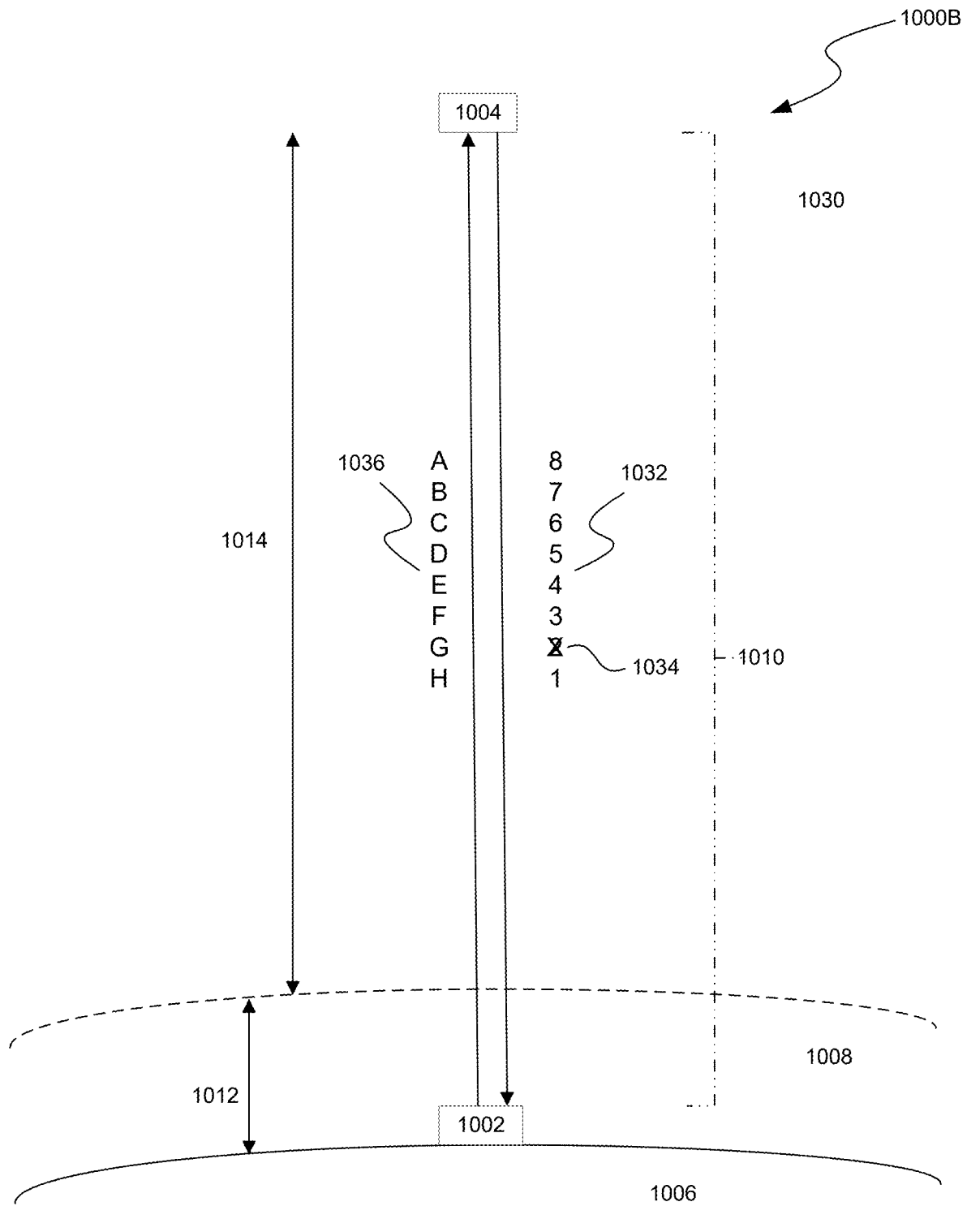
FIG. 10B illustrates an example of a ground-to-space and/or space-to-ground free-space optical channel through which data blocks are retransmitted, before an acknowledgement of the data blocks is received, based on a received corrupted data block.

FIG. 10B illustrates an example 1000B of a ground-to-space and/or space-to-ground free-space optical channel 1010 through which a redundant data block is sent before an acknowledgement of the originally transmitted data packet is received. The locally determined characteristics of free-space optical channel 1010 can provide a good approximation of the disturbances of free-space optical channel 1010 in both the forward and reverse directions. Therefore, determined characteristics can provide a good approximation of the deterioration of bits traveling in both the forward and the reverse directions.

In example 1000B, a reverse link stream of blocks 1032 (represented by 12345678) propagates through the reverse direction of free-space optical channel 1010 from second terminal 1004 and is received by first terminal 1002. As used herein, a "block" can include multiple bits, e.g., 100 million bits in some implementations. In some implementations, each block can be the same size, although the blocks can be different sizes in some implementations. The reception of the reverse link stream of blocks 1032 may suggest that the block 1034 is not properly received (e.g., corrupted), which can be indicative of deteriorated conditions of free-space optical channel 1010. In some implementations, an adaptive encoder within first terminal 1002 can determine, based on the time of transmission and/or receipt of receive link stream of blocks 1032, that forward link stream of blocks 1020 of FIG. 10A (sent within a threshold period of time of the time of transmission and/or receipt of receive link stream of blocks 1032) may also be corrupted. Thus, in example 1000B, first terminal 1002 can proactively retransmit the forward link stream of blocks 1036 transmitted in example 1000A (represented by ABCDEFGH) through the forward direction of free-space optical channel 1010 from first terminal 1002 to second terminal 1004. In other implementations, however, first terminal 1002 can retransmit the forward link stream of blocks 1036 with a redundant block corresponding to block 1034, which may be indicative that corresponding bit "B" will not be properly received, e.g., can retransmit as ABCDBEFGH.

Figure 10C:
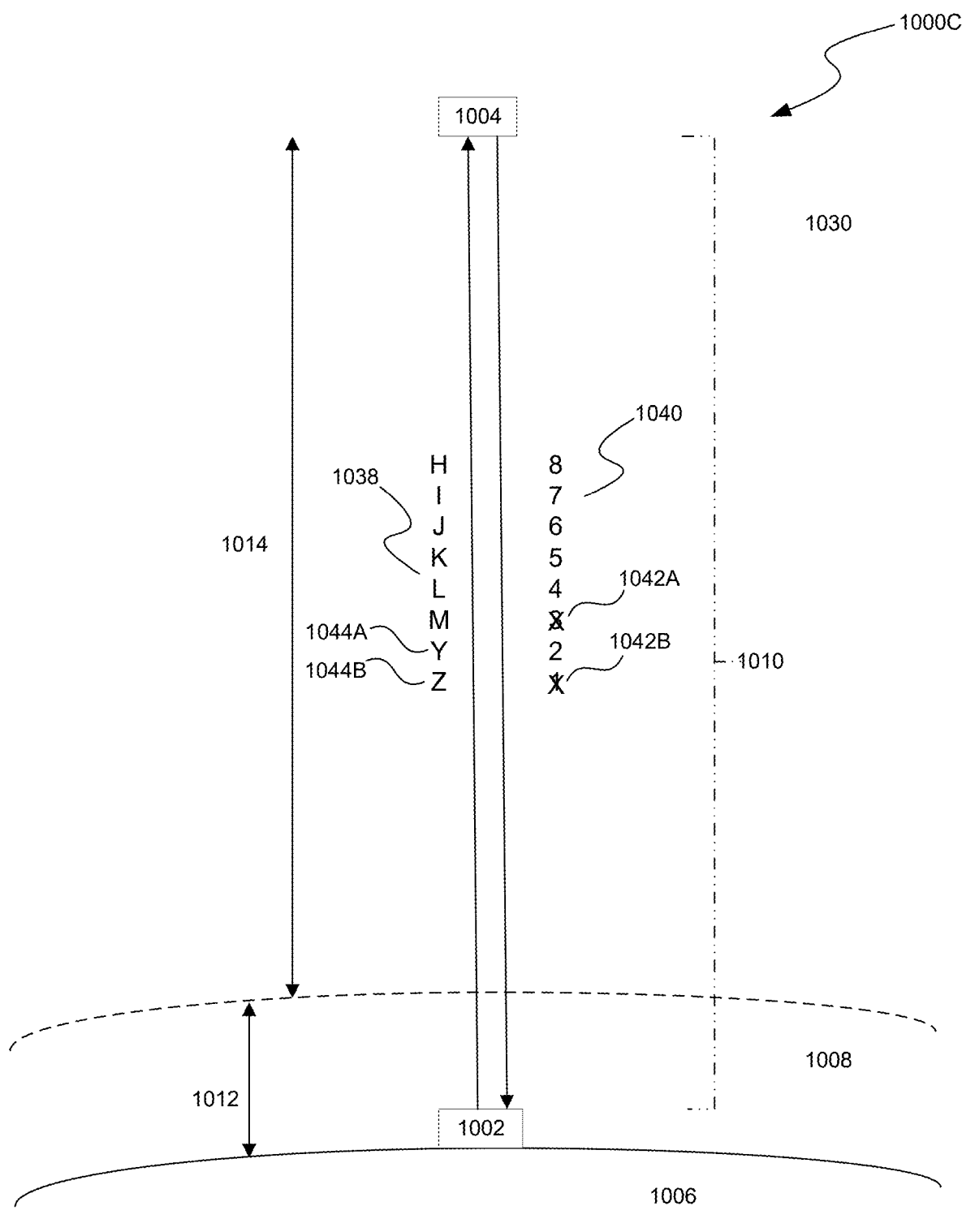
FIG. 10C illustrates an example of a ground-to-space and/or space-to-ground free-space optical channel through which repair blocks are sent for data blocks, before an acknowledgment of the data blocks is received, based on received corrupted data blocks.

FIG. 10C illustrates an example of a ground-to-space and/or space-to-ground free-space optical channel 1010 through which repair blocks 1038 are sent for previously generated data blocks before an acknowledgment of the originally transmitted data blocks is received. In example 1000C, a reverse link stream of blocks 1040 (represented by 12345678) propagates through the reverse direction of free-space optical channel 1010 from second terminal 1004 and is received by first terminal 1002. The reception of reverse link stream of blocks 1040 may suggest that blocks 1042A-1042B are not properly received (e.g., corrupted), which can be indicative of deteriorated conditions of free-space optical channel 1010.

In some implementations, an adaptive encoder within first terminal 1002 can determine, based on the time of transmission and/or receipt of reverse link stream of blocks 1040, that forward link stream of blocks 1020 of FIG. 10A (sent within a threshold period of time of the time of transmission and/or receipt of receive link stream of blocks 1040) may also be corrupted. Thus, in example 1000C, first terminal 1002 can proactively transmit repair blocks 1038 for forward link stream of blocks 1020 of FIG. 10A. In this example, repair blocks 1038 can include source blocks for a next data block (represented by HIJKLM) and two parity blocks 1044A-1044B for previously transmitted forward link stream of blocks 1020 of FIG. 10A (represented by YZ). In other words, the adaptive encoder can adjust the code rate from 8 source blocks/8 total blocks (as in forward link stream of bits 1020 of FIG. 10A) to 6 source blocks/8 total blocks in example 10C.

Figure 10D:
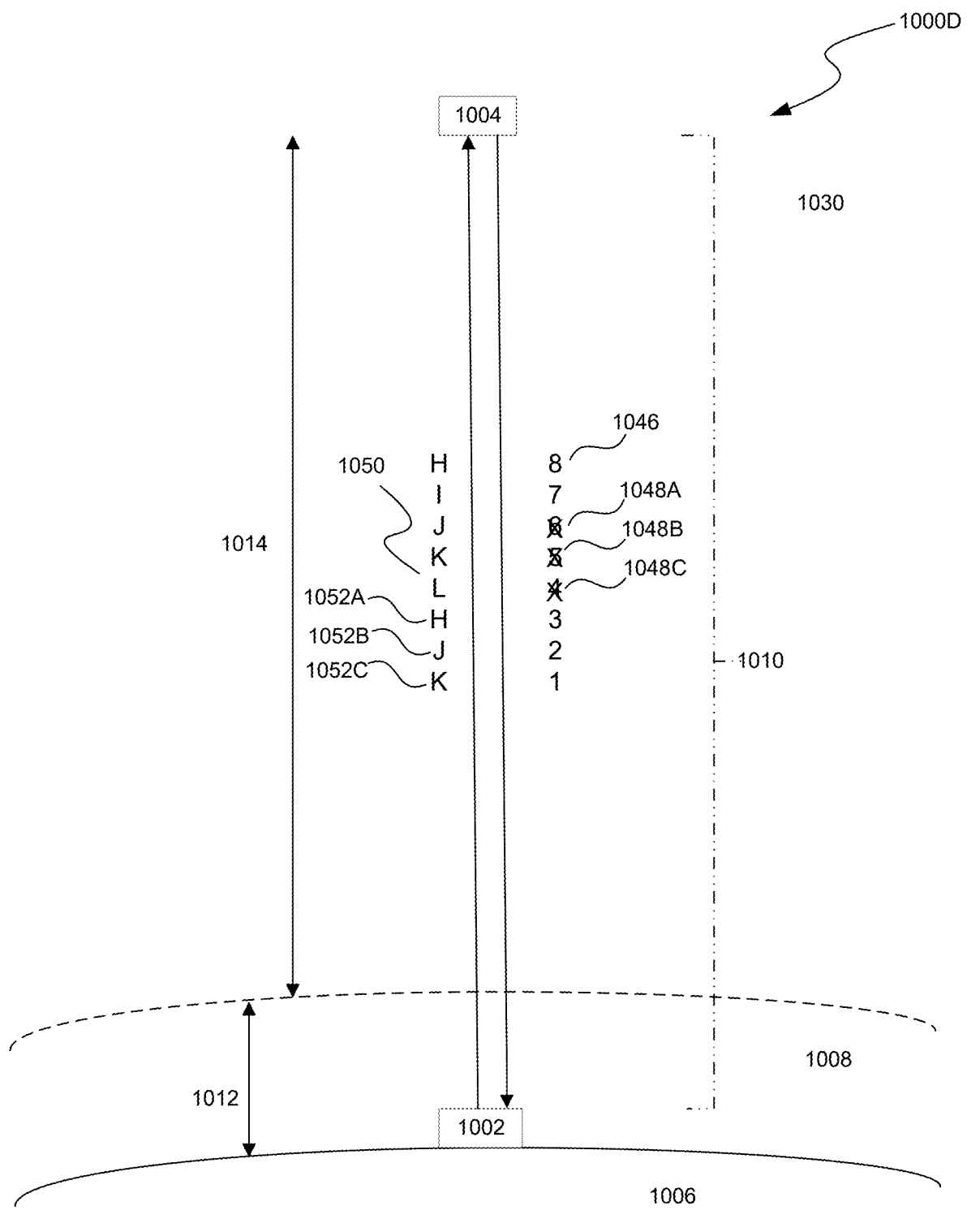
FIG. 10D illustrates an example of a ground-to-space and/or space-to-ground free-space optical channel through which future data blocks are adaptively encoded with error correction blocks based on the reception of corrupted data blocks.

FIG. 10D illustrates an example 1000D of a ground-to-space and/or space-to-ground free-space optical channel 1010 through which a forward link stream of blocks 1050, transmitted after forward link stream of blocks 1020 of FIG. 10A, is adaptively encoded with error correction blocks 1052A-1052C. In example 1000D, a reverse link stream of blocks 1046 (represented by 12345678) propagates through the reverse direction of free-space optical channel 1010 from second terminal 1004 and is received by first terminal 1002. The reception of reverse link stream of blocks 1040 may suggest that blocks 1048A-1048C are not properly received (e.g., corrupted), which can be indicative of deteriorated conditions of free-space optical channel 1010.

In some implementations, an adaptive encoder within first terminal 1002 can change the code rate for forward link stream of blocks 1050, transmitted after receipt of reverse link stream of blocks 1046, based on the presence of corruption in reverse link stream of blocks 1040. For example, the adaptive encoder can determine that reverse link stream of blocks 1046 has three corrupted blocks 1048A-1048C, and can adjust the code rate for future transmissions to include three error correction blocks, e.g., error correction blocks 1052A-1052C of forward link stream of blocks 1050. In other words, relative to previously transmitted forward link stream of blocks 1020 of FIG. 10A, the adaptive encoder can adjust the code rate from 8 source blocks/8 total blocks to 5 source blocks/8 total blocks in example 1000D. Error correction blocks 1052A-1052C (represented by HJK) can be redundant with source blocks included in forward link stream of blocks 1050. In other implementations, however, the error correction blocks can be selected based on the particular error correction blocks 1052A-1052C that are corrupted, e.g., the fourth through sixth bits of source data in forward linked stream of bits 1020.

Figure 11:
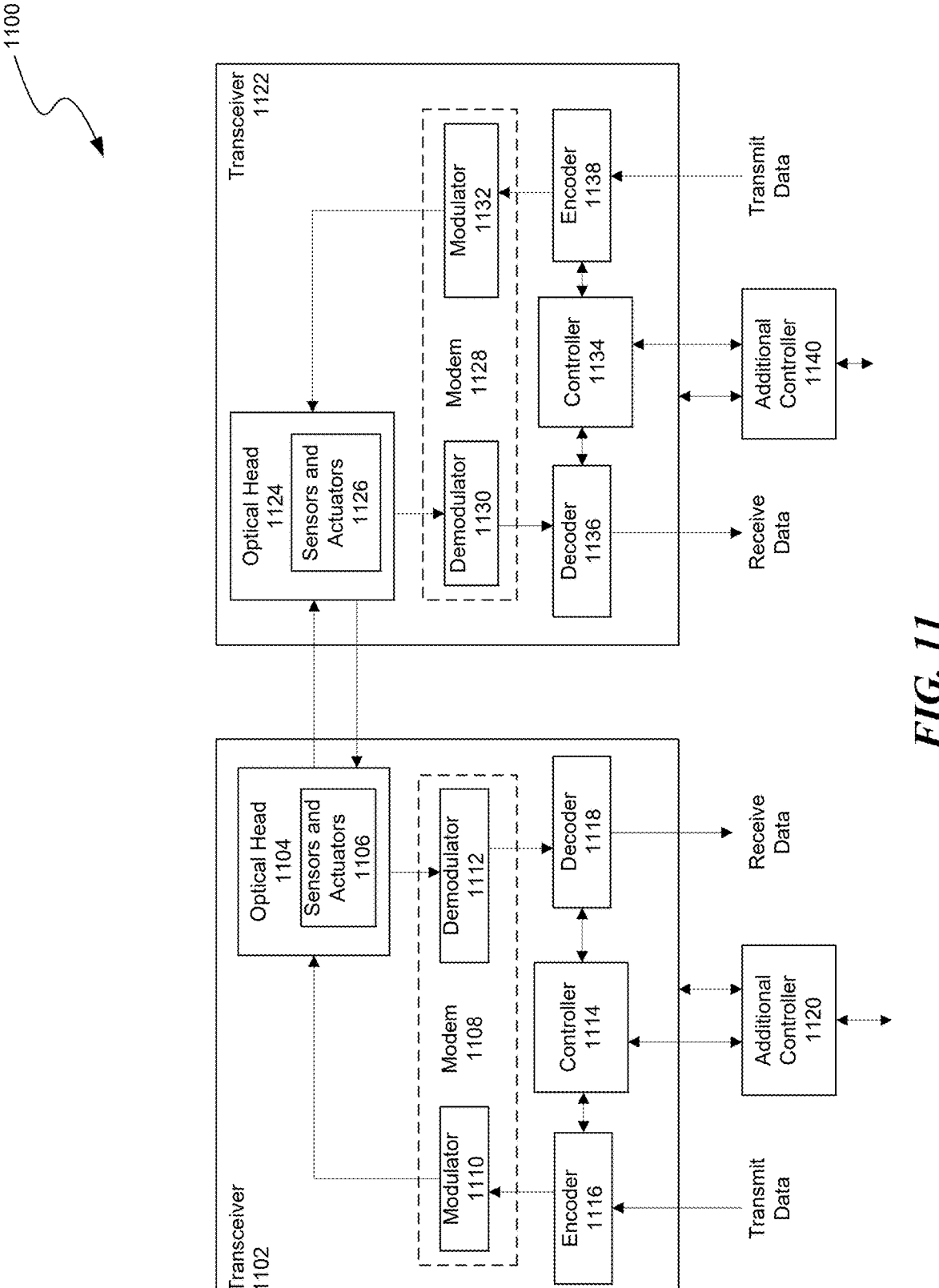
FIG. 11 is a simplified block diagram of a point-to-point free space optical communication system.

FIG. 11 is a simplified block diagram of a point-to-point free space optical communication system 1100. The free-space optical communication system 1100 can include two transceivers 1102, 1122 in optical communication. In a forward link direction relative to transceiver 1102, transceiver 1102 can receive transmit data that is encoded by encoder 1116 according to instructions generated by controller 1114 and/or additional controller 1120. Controller 1114 and/or additional controller 1120 (external to transceiver 1102) can include adaptive coding logic, described further herein, configured to control code rate of the transmit data encoded by encoder 1116. Encoder 1116 can provide the encoded data to modulator 1110 of modem 1108, which can optically modulate the encoded data. Modulator 1110 can then provide the modulated signal to optical head 1114, including sensors and actuators 1106. Optical head 1114 can transmit the signal to optical head 1124 of transceiver 1122.

Optical head 1124 of transceiver 1122 can receive the data signal and provide it to demodulator 1130 of modem 1128. Demodulator 1130 can optically demodulate the received data signal and provide it to decoder 1136, which can decode the demodulated signal. Decoder 1136 can then output the decoded data stream.

In a reverse link direction relative to transceiver 1102, transceiver 1122 can receive transmit data that is encoded by encoder 1138 according to instructions generated by controller 1134 and/or additional controller 1140. Controller 1134 and/or additional controller 1140 (external to transceiver 1112) can include adaptive coding logic, described further herein, configured to control code rate of the transmit data encoded by encoder 1138. Encoder 1138 can provide the encoded data to modulator 1132 of modem 1128, which can optically modulate the encoded data. Modulator 1132 can then provide the modulated signal to optical head 1124, including sensors and actuators 1126. Optical head 1124 can transmit the signal to optical head 1104 of transceiver 1102.

Optical head 1104 can receive data from optical head 1124 of transceiver 1122. Optical head 1104 can provide the received data to demodulator 1112, which can optically demodulate the received data, and provide the demodulated signal to decoder 1118. Decoder 1118 can then decode the demodulated signal and output the decoded data stream.

Those skilled in the art will appreciate that the physical and logical components illustrated above may be altered in a variety of ways. For example, the order of the logic may be rearranged, substeps may be performed in parallel, illustrated logic may be omitted, other logic may be included, etc.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for providing adaptive coding for transmitted data packets, the method comprising:

transmitting, by a first optical transceiver via an optical channel, a first series of data packets to a second optical transceiver, the first series of data packets having a code rate corresponding to a proportion of i) one or more bits that carry source data to ii) total bits in respective data packets of the first series of data packets;

receiving, by the first optical transceiver via the optical channel, a signal corresponding to a second series of data packets from the second optical transceiver;

estimating, based at least partially on one or more characteristics of the received signal corresponding to the second series of data packets, one or more transmission conditions of the optical channel; and performing, based on the estimated one or more transmission conditions of the optical channel, at least one of:

A) retransmitting at least one first data packet, of the first series of data packets, to the second optical transceiver;

B) transmitting repair data relevant to at least one particular data packet of the first series of data packets, to the second optical transceiver;

C) adapting the code rate, for a third series of data packets to be transmitted to the second optical transceiver, by modifying the proportion of one or more bits that carry source data to total bits in respective data packets of the third series of data packets, wherein the respective data packets of the third series of data packets each include at least one error correction bit in the total bits; or D) any combination thereof.

2. The method of claim 1, wherein, based on the estimated one or more transmission conditions of the optical channel, at least A), B), or both is performed, wherein the one or more characteristics of the received second series of data packets includes at least one data packet, of the second series of data packets, being corrupted, wherein the at least one corrupted data packet has at least one associated time of transmission and/or reception, and wherein the method further comprises:

identifying the at least one first data packet and/or the at least one particular data packet based on a time of transmission, of the at least one first data packet and/or the at least one particular data packet, being within a threshold time period of the at least one time of transmission and/or reception associated with the at least one corrupted data packet.

3. The method of claim 1, wherein at least one of A), B), C), or D) is performed prior to receiving, from the second optical transceiver, any information derived by the second optical transceiver from its reception of attempted reception of the first series of data packets.

4. The method of claim 1, wherein at least C) is performed and wherein, further based on the estimated one or more transmission conditions of the optical channel, the method further comprises performing at least one of:

E) modifying code type for the third series of data packets to be transmitted to the second optical transceiver;

F) modifying modulation for the third series of data packets to be transmitted to the second optical transceiver;

G) modifying transmit power for the third series of data packets to be transmitted to the second optical transceiver;

H) modifying baud rate for the third series of data packets to be transmitted to the second optical transceiver;

I) modifying interleaving type or characteristics for the third series of data packets to be transmitted to the second optical transceiver; or J) any combination thereof.

5. The method of claim 1, wherein the at least one error correction bit is redundant with at least one bit of source data.

6. The method of claim 1, wherein the optical channel is a free-space optical channel.

7. The method of claim 1, wherein the first optical transceiver is included in an optical ground station, and wherein the second optical transceiver is included in a satellite terminal.

8. The method of claim 1, wherein the one or more characteristics includes corruption of at least one data packet of the second series of data packets.

9. The method of claim 1, wherein performance of the optical channel is asymmetrical.

10. The method of claim 1, further comprising:

causing the second optical transceiver to throttle its data transmissions while at least one of A), B), C), or D) is performed.

11. The method of claim 1, wherein at least one of A), B), or both is repeated until an acknowledgment, of receipt of the first series of data packets from the second optical transceiver, is received by the first optical transceiver.

12. The method of claim 1, wherein, based on the estimated one or more transmission conditions of the optical channel, at least C) is performed, and wherein utilized forward error correction of the third series of data packets is rateless, windowless, or both.

13. An optical system comprising:

a first optical transceiver configured to:

transmit, via an optical channel, a first series of data packets to a second optical transceiver, the first series of data packets having a code rate corresponding to a proportion of i) one or more bits that carry source data to ii) total bits in respective data packets of the first series of data packets; and receive, via the optical channel, a signal corresponding to a second series of data packets from the second optical transceiver; and an adaptive coder configured to:

estimate, based at least partially on one or more characteristics of the received signal corresponding to the second series of data packets, one or more transmission conditions of the optical channel; and based on the detected change in the one or more conditions of the optical channel, adapt the code rate, for a third series of data packets to be transmitted to the second optical transceiver, by modifying the proportion of one or more bits that carry source data to total bits in respective ones of the third series of data packets.

14. The optical system of claim 13, wherein the first optical transceiver is further configured to:

based on the estimated one or more transmission conditions of the optical channel, perform at least one of:

A) retransmitting at least one first data packet, of the first series of data packets, to the second optical transceiver;

B) transmitting one or more repair packets, relevant to at least one particular data packet of the first series of data packets, to the second optical transceiver; or C) both.

15. The optical system of claim 14, wherein the estimated one or more transmission conditions indicate deterioration of the optical channel at an associated time, and wherein the adaptive coder is further configured to:

identify the at least one first data packet and/or the at least one particular data packet based on a time, of the at least one first data packet and/or the at least one particular data packet, being within a threshold time period of the time associated with the indicated deterioration of the optical channel.

16. The optical system of claim 14, wherein at least one of A), B), or C) is performed prior to receiving any signal or information derived from reception or attempted reception of the first series of data packets from the second optical transceiver.

17. A computer-readable storage medium storing instructions that, when executed by a computing system, cause the computing system to perform a process for providing adaptive coding for transmitted data packets, the process comprising:

transmitting, via a communications channel, a first series of data packets to a transceiver, the first series of data packets having a code rate corresponding to a proportion of i) one or more bits that carry source data to ii) total bits in respective data packets of the first series of data packets;

receiving, via the communications channel, a signal corresponding to a second series of data packets from the transceiver;

estimating, based at least partially on one or more characteristics of the received signal corresponding to the second series of data packets, one or more transmission conditions of the communications channel; and based on the detected one or more transmission conditions of the communications channel, performing at least one of A) sending correction information relevant to one or more first data packets of the first series of data packets, B) modifying one or more future transmission characteristics, or C) both.

18. The computer-readable storage medium of claim 17, wherein the communications channel is an optical channel.

19. The computer-readable storage medium of claim 17, wherein the process comprises sending the correction information for the one or more first data packets, and wherein the sending the correction information includes at least one of retransmitting the one or more first data packets, transmitting one or more repair packets corresponding to the one or more first data packets, or both.

20. The computer-readable storage medium of claim 17, wherein the process comprises modifying the one or more future transmission characteristics, and wherein the modifying the one or more future transmission characteristics includes adapting at least one of C) the code rate, D) code type, E) modulation, F) transmit power, G) baud rate, or H) any combination thereof, for a third series of data packets to be transmitted to the transceiver.

\* \* \* \* \*